(12) United States Patent
Fujimoto et al.

(10) Patent No.: US 8,350,104 B2
(45) Date of Patent: *Jan. 8, 2013

(54) METHOD FOR CATALYTICALLY CRACKING WASTE PLASTICS AND APPARATUS FOR CATALYTICALLY CRACKING WASTE PLASTICS

(75) Inventors: Kaoru Fujimoto, Fukuoka (JP); Xiaohong Li, Fukuoka (JP)

(73) Assignee: Kitakyushu Foundation for the Advancement of Industry, Science and Technology, Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/051,200

(22) Filed: Mar. 18, 2011

(65) Prior Publication Data

US 2011/0166397 A1  Jul. 7, 2011

Related U.S. Application Data

(63) Continuation of application No. 11/588,378, filed on Oct. 27, 2006, now Pat. No. 7,932,424.

(30) Foreign Application Priority Data

Jan. 26, 2006 (JP) ................................ 2006-018257
Jul. 26, 2006 (JP) ................................ 2006-203775

(51) Int. Cl.
*C10G 1/10* (2006.01)

(52) U.S. Cl. ........ 585/241; 502/255; 422/198; 422/224; 201/2.5; 201/8; 201/23; 201/25; 201/28; 201/33; 201/35

(58) Field of Classification Search .................. 422/209; 366/219–220; 432/103, 105–107; 585/241; 201/25, 33, 35
See application file for complete search history.

(56) References Cited

U.S. PATENT DOCUMENTS 4,108,730 A * 8/1978 Chen et al. ..................... 201/2.5
5,095,040 A    3/1992 Ledford
(Continued)

FOREIGN PATENT DOCUMENTS
EP    0865822 A1    9/1998
(Continued)

OTHER PUBLICATIONS

Japanese conference paper 1 Catalytically cracking waste plastics to petroleum Oct. 27 and 28, 2005, Haruki Tani, Xiaohong Li, Kaoru Fujimoto, Hiroshi Takada.

(Continued)

*Primary Examiner* — Brian McCaig
(74) *Attorney, Agent, or Firm* — Sughrue Mion, PLLC

(57) ABSTRACT

To provide a method for catalytically cracking waste plastics wherein the efficiency in decomposition is high; even polyethylene composed of linear chain molecules difficult in decomposition is decomposable at a low temperature and decomposed residue is hardly produced; the process is simple since dechlorination can be achieved at the same time with catalytically cracking waste plastics in one reaction vessel; and oil fractions can be recovered at 50% or more on a net yield basis. The method for catalytically cracking waste plastics of the present invention has a constitution in which waste plastics are loaded as a raw material into a granular FCC catalyst heated to a temperature range from 350° C. to 500° C. inside a reaction vessel, thereby decomposing and gasifying the waste plastics in contact with the FCC catalyst.

14 Claims, 12 Drawing Sheets

U.S. PATENT DOCUMENTS

| | | | |
|---|---|---|---|
| 5,372,704 | A | 12/1994 | Harandi et al. |
| 5,481,052 | A | 1/1996 | Hardman et al. |
| 5,700,751 | A | 12/1997 | Yang |
| 6,534,689 | B1 | 3/2003 | Stankevitch |
| 7,932,424 | B2 * | 4/2011 | Fujimoto et al. .............. 585/241 |

FOREIGN PATENT DOCUMENTS

| | | |
|---|---|---|
| JP | 48-967 | 1/1973 |
| JP | 50-50481 | 5/1975 |
| JP | 53-40682 | 4/1978 |
| JP | 6-41547 | 2/1994 |
| JP | 2001-107058 A | 4/2001 |
| JP | 2001-129405 A | 5/2001 |
| JP | 2003-138275 A | 5/2003 |
| JP | 2005-187794 A | 7/2005 |

OTHER PUBLICATIONS

Japanese conference paper 2 Development of technology for cracking waste plastics to petroleum using post consumer FCC catalyst Oct. 1, 2006, Haruki Tani, Kaoru Fujimoto.

Japanese conference paper 3 Development of process for cracking waste plastics to petroleum using FCC catalyst Aug. 3 and 4, 2006, Haruki Tani, Xiaohong Li, Kaoru Fujimoto.

Japanese conference paper 6 Development of process for cracking waste plastics to petroleum using FCC catalyst Aug. 28 and 29, 2006, Haruki Tani, Hiroyuki Haga, Xiaohong Li, Kaoru Fujimoto.

Japanese Office Action issued in corresponding JP application No. 2007-555927, dated Jul. 2, 2009.

International Searching Authority, International Search Report in PCT/JP2007/050929, mailed Apr. 10, 2007.

* cited by examiner

Material balance (weight basis)

| Waste plastics | (100) | | Cracked oil | 85 |
|---|---|---|---|---|
| Catalyst | (3) | Reaction | Decomposed gas ($Cl_2$, $C_1$~$C_4$) | 10 |
| Hydrated lime and others | (4) | | Waste catalyst (with coke) | 4 |
| | | | Residue (including hydrated lime) $Ca_2(OH)_2$, $CaCl_2$ | 6 |
| Material balance | | | Water and others | 2 |

METHOD FOR CATALYTICALLY CRACKING WASTE PLASTICS AND APPARATUS FOR CATALYTICALLY CRACKING WASTE PLASTICS

CROSS-REFERENCE TO RELATED PATENT APPLICATION

This application is a continuation application of U.S. application Ser. No. 11/588,378, filed Oct. 27, 2006 (now U.S. Pat. No. 7,932,424), which claims the benefit of Japanese Patent Application Nos. 2006-018257, filed on Jan. 26, 2006 and 2006-203775, filed on Jul. 26, 2006 in the Japanese Intellectual Property Office, the disclosures of which are incorporated herein in their entireties by reference.

TECHNICAL FIELD

The present invention relates to a method for thermally decomposing waste plastics, namely, waste materials of plastics such as polyethylene (PE), polypropylene (PP), polystyrene (PS) or polyethylene terephthalate (PET) and waste plastics having a resin, for example, polyvinyl chloride (PVC), in which chlorine is contained as a composition, and an apparatus therefor.

BACKGROUND OF THE INVENTION

Currently, in Japan, about 10 million tons of plastics are being discarded annually as industrial waste or general waste, about 55% of which are used effectively. Most of these waste plastics are used as fuels for generating electricity or other heat sources, and not substantially recycled as chemical materials. An unused portion of these waste plastics is disposed of in landfills or subjected to incineration disposal. However, available landfills are becoming tighter year by year and there is a fear of generating dioxins on incineration when resins are mixed such as polyvinyl chloride (PVC) containing a chlorine-based composition.

Under these circumstances, such technology development is ardently desired that waste plastics be subjected to thermal decomposition to obtain a petroleum resource such as fuel oil. More specifically, waste plastics are subjected to thermal decomposition and utilized as a petroleum resource. The thus obtained petroleum resource is used as gasoline, kerosene, light oil or heavy oil. Alternatively, waste plastics are subjected to thermal decomposition to obtain an oil fraction. The oil fraction is further separated into a naphtha fraction which is then used as a raw material for producing chemicals. Various technologies are known by which waste plastics are thermally decomposed to obtain oil fractions as described above.

As technology in which waste plastics having a mixture of resin containing chlorine as a composition, for example, polyvinyl chloride (PVC), are thermally decomposed to obtain an oil fraction, Patent Document 1 has disclosed a method for thermally decomposing waste plastics to petroleum, including a first thermal decomposition step in which high-temperature sands (600° C. to 950° C.) are added to waste plastics and heated to a temperature range from 250° C. to 350° C. to separate chlorine, a second thermal decomposition step in which waste plastics from which the chlorine content is removed are further heated to a higher temperature range (350° C. to 500° C.) with high-temperature sands (600° C. to 950° C.) to effect thermal decomposition, and an combustion step in which gaseous combustible substances formed at the first thermal decomposition step and decomposed residue formed at the second thermal decomposition step is subjected to combustion, wherein at the first thermal decomposition step the waste plastics are brought into contact with fine particles of a neutralizing agent (hydrated lime and the like), a separated chlorine content is coupled to the neutralizing agent, and at least a part of the neutralizing agent coupled to the chlorine content is led to the combustion step together with gaseous combustible substances formed at the first thermal decomposition step. In this conventional technology, FCC waste catalysts are also added to a thermal decomposition area at the second thermal decomposition step at 5 weight % to 35 weight % with respect to waste plastics.

Patent Document 1: Japanese Published Unexamined Patent Application No. 2001-107058

SUMMARY OF THE INVENTION

However, the above-described conventional technology has the following problems.

(1) The conventional technology is carried out on the basis of a first thermal decomposition step in which high-temperature sands are added to waste plastics to separate chlorine content and a second thermal decomposition step in which waste plastics from which chlorine content is removed are further heated by using sands as a fluid vehicle to a higher temperature, thereby causing thermal decomposition. Namely, since the technology is a multiple stage process in which sands are used as a fluid vehicle in all the steps, an apparatus is complicated in structure to raise the processing cost, which is a problem. The efficiency of decomposition reaction is poor, and net yield of oil fractions is low in decomposing cracked gas to petroleum, which is also a problem.

(2) Hydrogen chloride is carried over from a dechlorination step of waste plastics to a thermal decomposition step, chlorine is left as organic chlorine content at 1000 ppm or more with respect to the thus obtained oil fraction, which is a problem.

(3) Polyethylene (PE) must be heated up to a high temperature (440° C. to 450° C.) on thermal decomposition, and it may easily cause carbonization when mixed with high-temperature sands, thereby generating a great amount of decomposed residue, which is also a problem.

The present invention solves the above-described conventional problems, an object of which is to provide a method for catalytically cracking waste plastics, which is excellent in decomposition reaction efficiency, capable of decomposing polyethylene composed of linear chain molecules difficult in decomposition, at a low temperature, with a negligible quantity of decomposed residue, simple in process and able to realize a high energy efficiency of 50% or more in terms of net yield of oil fraction, and a catalytically cracking apparatus.

In order to solve the above problems, a method for catalytically cracking waste plastics and an apparatus for catalytically cracking waste plastics according to the present invention are constituted as follows.

The method for catalytically cracking waste plastics according to a first aspect of the present invention is constituted so that waste plastics are loaded as a raw material into a granular FCC catalyst heated to a temperature range from 350° C. to 500° C. inside a reaction vessel, thereby the waste plastics in contact with the FCC catalyst are decomposed and gasified.

The following actions are obtained due to the above-described constitution.

(1) Granular FCC catalyst is used as a thermal vehicle and waste plastics (a raw material) are loaded into the preliminarily heated FCC catalyst inside the reaction vessel, by which the granular FCC catalyst is brought into contact with the waste plastics to facilitate the heat transfer and reaction and catalytically crack the waste plastics at short times. Therefore, even polyethylene composed of linear chain molecules difficult in decomposition is decomposable at a low temperature, and decomposed residue is hardly produced, with carbonization kept to a negligible level.

(2) Since a granular FCC catalyst large in specific surface area is used as a thermal vehicle to facilitate the heat transfer and reaction through contact with waste plastics in one reaction vessel, the process is simple and the energy efficiency is high.

In this instance, the waste plastics are waste mainly containing plastics which are separated from urban wastes and industrial waste and based on thermoplastic resins such as polyethylene, polypropylene, polystyrene and polyethylene terephthalate. They may contain polyvinyl chloride (PVC) including chlorine as a composition or foreign substances, such as thermosetting plastic, FRP, paper. Reinforced fiber of FRP may be discharged out of the reaction vessel regularly as decomposed residue.

It is preferable to use waste plastics which are broken down into small pieces such as beads, flakes, chips, granules or pellets in view of an increase in catalytically cracking efficiency. Large waste plastics formed in a mass may be subjected to decomposition and subsequent processes but not desirable due to a longer time required for the processes.

The FCC catalyst used is a solid acid catalyst based on synthetic zeolite which is granulated into granular particles of 40 to 80 μm used in the FCC (fluid catalyst cracking) process of petroleum. Since the FCC catalyst is substantially similar to waste plastics in mean specific gravity of 0.74 to 0.91, it can be mixed well with waste plastics inside a reaction vessel. Off-specification catalysts discharged from catalyst manufacturers and waste catalysts discharged from petroleum refinery plants may also be used. A mixture of these catalysts may also be used.

The waste catalyst is called FCC (U) (fluid catalyst cracking (used)) and obtained by regenerating catalysts used in fluid catalytic cracking for selectively catalytically cracking a wide variety of petroleum fractions covering light oil to normal pressure residue. It is also called an equivalent catalyst or regenerated catalyst. In petroleum refining plants, the catalyst is recycled between a catalytic cracking area and a regeneration area. A new catalyst is constantly supplied in a predetermined quantity to offset catalytic deterioration. A quantity of the catalyst corresponding to the thus supplied quantity is discharged outside a system. Waste catalysts discharged outside the system are recycled inside the system and still have a sufficient catalytic activity. More specifically, catalysts used in refining crude oil are taken out in a state where coke and others are still mixed, sent to a regeneration tower after steam stripping of associated hydrocarbons, into which air is blown, thereby burning the coke to activate the catalysts. For example, the FCC catalyst obtained at refinery plants and others is 0.74 to 0.91 in mean specific gravity, which is substantially equal to that of waste plastics, and can be mixed well inside a reaction vessel. It is from 61 to 75 μm in mean particle size and quite low in cost, as compared with a new catalyst. Further, the FCC catalyst is a synthetic zeolite mainly based on $SiO_2$ and $Al_2O_3$, and catalysts in which Na, Fe, C, V, Ni, Sb and others are mixed in a small quantity are commonly used.

FCC catalysts and waste plastics inside a reaction vessel are mixed by means of agitation, and the like, by the which waste plastics are brought into contact with the FCC catalyst to cause decomposition and gasification of the waste plastics.

The FCC catalyst inside the reaction vessel should be heated in a range from 350° C. to 500° C., preferably from 400° C. to 480° C. and more preferably from 410° C. to 430° C. As the heating temperature decreases to 410° C. or lower, wax content in oil fractions decreases accordingly but such a tendency is found that decomposition occurs for a longer time. As the temperature increases to 430° C. or higher, the decomposition can be shortened but there is a tendency that the wax content in oil fractions increases. As the temperature decreases to 400° C. or lower, in addition to the above-described tendencies, such a tendency is also found that decomposed residue increases. Further, as the temperature decreases to 350° C. or lower, this tendency is more conspicuous, which is not desirable. As the temperature increases to 480° C. or higher, in addition to the tendencies so far described, waste plastics are carbonized easily and there is a tendency that decomposed residue increases. As the temperature increases to 500° C. or higher, this tendency is conspicuous, which is not desirable.

The FCC catalyst is preferably used in a quantity corresponding to 20 to 60 vol % of the capacity of a reaction vessel. When a quantity of the FCC catalyst is lower than 20 vol % of the capacity of the reaction vessel, waste plastics are in contact with the FCC catalyst in a smaller quantity, resulting in a longer decomposition and processing time and a lower processing efficiency. Where a quantity of the FCC catalyst is larger than 60 vol % or more, the FCC catalyst and decomposed residue must be discharged frequently, thereby making the operation troublesome, which is not desirable. This is due to the fact that when waste plastics are loaded into the reaction vessel one after another, decomposed residue resulting from the waste plastics (carbon of paper labels and plastics or metals adhered to waste plastics and others) are accumulated, the reaction vessel is filled with the FCC catalyst and the decomposed residue, restricting a quantity of the waste plastics loaded into the reaction vessel, and the FCC catalyst and the decomposed residue must be frequently discharged for loading the waste plastics constantly.

When the FCC catalyst is used, waste plastics, for example, polyethylene (PE) will undergo decomposition by ion reaction. The FCC catalyst is zeolite, namely, an acid catalyst. In decomposition of waste plastics, at first, this acid catalyst supplies protons to carbon, thereby generating pentacoordinate carbon. Since the pentacoordinate carbon is unstable, it releases hydrogen to be a carbenium ion. The carbenium ion is in an equilibrium state that ion-sharing intermediates are found. Most of the carbenium ions are structured to undergo skeletal isomerization due to a higher stability of the structure. Since a carbenium ion is also liable to break down at the linkage of beta position, it is decomposed into an i-paraffin and carbenium ion. This carbenium ion repeats decomposition through isomerization and formation of intermediates. Further, when $H^-$ is obtained in a state of a carbenium ion, it is not decomposed but kept isomerized in the structure.

In contrast, where a carbenium ion contains many double bonds, it is formed into a hexagonal intermediate and aromatized. A linear-chain carbenium ion is decomposed to have olefin and $H^-$ and then formed into a paraffin. Therefore, the products are mostly branched and it is considered that the products become diversified. This finding is also in agreement with the results of Examples. Further, a larger content of branched and aromatized products may frequently cause a steric hindrance, resulting in a poor crystallization and a decreased content of wax. Further, since reactions for generating a carbenium ion take place at a lower temperature than radical chain reactions, a carbenium ion is easily decomposable to facilitate the reactions, by which the ion may be formed into lower molecular weight products. As a result, the use of the FCC catalyst (FCC(U)) makes it possible to decompose polyethylene (PE) at a low temperature, thereby eliminating problems of carbonization and wax conversion and successfully providing a high-quality cracked oil.

Further, waste plastics are preferably subjected to catalytically cracking under a normal pressure. This is because waste plastics may be hardly evaporated and easily carbonized on application of pressure. However, in order to prevent carbonization of waste plastics, the pressure inside a reaction vessel may be reduced to catalytically crack waste plastics at a low temperature.

The present invention is a method for catalytically cracking waste plastics discussed above, which is constituted so that cracked gas generated by decomposition and gasification of the waste plastics is cooled to obtain oil fractions.

The following actions are obtained due to the above-described constitution, in addition to the action discussed above.

(1) Waste plastics are facilitated for heat transfer and reaction, subjected to catalytically cracking, and then cooled to obtain oil fractions. Therefore, even polyethylene (PE) difficult in decomposition is decomposable at a low temperature to obtain oil fractions at a high yield of 90%. The oil fractions can be recovered at 50% or more on a net yield basis, thereby attaining a high energy efficiency.

(2) Since even polyethylene composed of linear chain molecules is decomposable at a low temperature, wax is less likely to be produced, thereby providing oil fractions lower in flow-point (0° C. or lower).

In this instance, a rare gas such as argon or an inert gas such as nitrogen is introduced as a carrier gas into a reaction vessel, by which cracked gas generated inside the reaction vessel can be taken out from the reaction vessel, together with the carrier gas.

The present invention is a method for catalytically cracking waste plastics discussed above, which is constituted so that granular Ca compounds are mixed with the FCC catalyst.

The following actions are obtained due to the above-described constitution, in addition to the action discussed above.

(1) In decomposing to petroleum waste plastics having resins, such as PVC, in which chlorine atoms are contained, no independent dechlorination step is needed, and hydrogen chloride generated by a dechlorination reaction is also removed instantly by reaction with Ca compounds, thereby making it possible to obtain oil fractions extremely low in chlorine concentration. In other words, organic chlorine is still found at 1000 ppm when the thermal decomposition is conducted according to a conventional technology, while it is found only at a decreased content of 100 ppm according to the present invention.

(2) Since hydrogen chloride generated by a dechlorination reaction reacts with Ca compounds inside a reaction vessel and is fixed into the Ca compounds, it is possible to prevent corrosion or others resulting from hydrogen chloride.

In this instance, $Ca(OH)_2$, $CaCO_3$, $CaO$ and the like are used as Ca compounds. Chlorine removed from waste plastics inside a reaction vessel is formed as hydrogen chloride. Ca compounds react with hydrogen chloride to form Ca chlorides, and hydrogen chloride is trapped by $Ca(OH)_2$, $CaCO_3$ and CaO according to the respective chemical reactions shown below.

$$CaO + 2HCl \rightarrow CaCl_2 + H_2O$$

$$CaCO_3 + 2HCl \rightarrow CaCl_2 + H_2O + CO_2$$

$$Ca(OH)_2 + 2HCl \rightarrow CaCl_2 + 2H_2O$$

[Chemical formula 1]

Ca compounds are mixed preferably at 15 to 50 parts by mass with respect to 100 parts by mass of the FCC catalyst. When Ca compounds are mixed at 15 parts by mass or less, hydrogen chloride which is not trapped is increased accordingly, although depending on a ratio of mixed resins containing chlorine atoms, thereby corroding a reaction vessel and others more frequently and resulting in a tendency that chlorine concentration in oil fractions is increased. When Ca compounds are mixed at 50 parts by mass or more, such a tendency is found that the run-off speed is slow in decomposition reaction of plastics and the yield is lowered, which is not desirable.

Further, Ca compounds are preferably mixed at 50 to 200 mol % with respect to a mass of resins containing chlorine atoms such as PVC. When Ca compounds are mixed at 50 mol % or less, hydrogen chloride which is not trapped is increased accordingly, and such a tendency is found that a reaction vessel and others are easily corroded. When they are mixed at 200 mol % or more, such a tendency is found that the run-off speed is slow in decomposition reaction of plastics and the yield is lowered, which is not desirable either.

Hydrogen chloride reacts with Ca compounds to form calcium chloride. This calcium chloride has found many applications such as an anti-freezing agent for roads, a dust control agent for roads and construction sites and food additive and can be used effectively.

The FCC catalyst and others remaining inside a reaction vessel after the decomposition reaction of waste plastics are washed to dissolve water-soluble calcium chloride in water, by which they are discharged outside the reaction vessel, and the FCC catalyst and unreacted Ca compounds difficult to dissolve in water may be allowed to remain inside the reaction vessel. The FCC catalyst and Ca compounds remaining inside the reaction vessel are regenerated after being dried inside the reaction vessel, and supplemented with Ca compounds for subsequent reuse. Calcium chloride in drainage after the FCC catalyst and the like are washed is determined for concentration to calculate a quantity of Ca compounds used in a dechlorination reaction, and then Ca compounds may be supplemented in the thus calculated quantity.

The present invention is a method for catalytically cracking waste plastics discussed above, which is constituted so that granular iron compounds are mixed with the FCC catalyst.

The following actions are obtained due to the above-described constitution, in addition to the action discussed above.

(1) Besides the FCC catalyst and Ca compounds, iron compounds are added and allowed to exist inside a reaction vessel, thereby attaining a remarkable improvement in the dechlorination rate and providing oil fractions extremely low in chlorine content of no more than 100 ppm, for example, 85 ppm.

(2) Addition of iron compounds makes it possible to prevent catalyst poisoning resulting from chlorine and extend the life of the FCC catalyst about 3 times, thereby providing a long-life FCC catalyst.

In this instance, iron oxides such as $Fe_2O_3$, iron hydroxide (III) (FeO(OH)) and substances containing iron hydroxide (III) such as iron ore are used as iron compounds.

Iron compounds are preferably mixed at 5 to 50 mass % with respect to the FCC catalyst. When the iron compounds are mixed at 5 mass % or less with respect to the FCC catalyst, such a tendency is found that dechlorination is decreased accordingly. When they are mixed at 50 mass % or more, such a tendency is found that waste plastics are brought into contact with the FCC catalyst less efficiently and the decomposition efficiency of the waste plastics is decreased accordingly, which is not desirable.

The present invention is a method for catalytically cracking waste plastics discussed above, which is constituted so that the iron compounds contain iron hydroxide (III) (FeO(OH)).

The following actions are obtained due to the above-described constitution, in addition to the action discussed above.

(1) Besides the FCC catalyst and Ca compounds, iron hydroxide (III) and others are added and allowed to exist inside a reaction vessel, thereby attaining a further improvement in the dechlorination rate and providing oil fractions extremely low in chlorine content of no more than 100 ppm, for example, 74 ppm.

In this instance, iron hydroxide (III) (FeO(OH)) and iron ore may be used as iron compounds containing iron hydroxide (III) (FeO(OH)).

The present invention is a method for catalytically cracking waste plastics discussed above, which is constituted so that the waste plastics are subjected to decomposition and gasification in an atmosphere where an inert gas is introduced into the reaction vessel.

The following actions are obtained due to the above-described constitution, in addition to the action discussed above.

(1) Waste plastics are subjected to decomposition and gasification in an atmosphere where an inert gas is introduced into a reaction vessel and the waste plastics are heated and decomposed inside the reaction vessel purged by the inert gas or scarce in oxygen, thereby making it possible to prevent generation of dioxins and contributing to the environmental protection.

In this instance, a rare gas such as argon, nitrogen and carbon dioxide may be used as an inert gas.

The flow rate of inert gas introduced into a reaction vessel and the concentration of inert gas inside the reaction vessel are appropriately established depending on the size of the reaction vessel and a quantity of waste plastics.

The present invention is a method for catalytically cracking waste plastics discussed above, in which the reaction vessel is a rotary kiln-type reaction vessel and which is constituted so that at least the FCC catalyst is loaded and agitated continuously to effect decomposition and gasification.

The following actions are obtained due to the above-described constitution, in addition to the action discussed above.

(1) The reaction vessel is a rotary kiln-type reaction vessel and the waste plastics are loaded continuously, agitated by rolling motion, and brought into contact with the FCC catalyst to effect decomposition and gasification. Thus, the operation can be conducted continuously to attain a remarkable improvement in productivity.

In this instance, since a heated FCC catalyst is available inside a reaction vessel, at least, waste plastics are loaded continuously, thereby making it possible to decompose and gasify the waste plastics. Ca compounds or iron compounds may be mixed in advance with the FCC catalyst inside the reaction vessel to load the waste plastics into the reaction vessel. Further, the Ca compounds, iron compounds and FCC catalyst may be loaded into the reaction vessel, together with the waste plastics.

After continuous operation for a predetermined time, the FCC catalyst, Ca compounds or iron compounds before or after reaction and decomposed residue of waste plastics remaining inside the reaction vessel are removed, and the FCC catalyst, Ca compounds and iron compounds are separated from the decomposed residue of the waste plastics by using a sieve or the like and taken out separately. Further, washing or the like is conducted to dissolve Ca compounds (calcium chloride) after reaction with hydrogen chloride, thereby making it possible to take out the Ca compounds, iron compounds and FCC catalyst before reaction.

The present invention is a method for manufacturing waste plastics discussed above, which is constituted to use a waste catalyst as the FCC catalyst.

The following actions are obtained due to the above-described constitution, in addition to the action discussed above.

(1) Where a waste catalyst is used as the FCC catalyst, waste catalysts (industrial waste), the treatment of which poses a problem, can be utilized effectively. Further, since they are quite low in cost as compared with a new catalyst, waste plastics can be subjected to decomposition at a low cost.

The apparatus for catalytically cracking waste plastics of the present invention is constituted to have a reaction vessel provided with a heating means for heating a granular FCC catalyst to a temperature range from 350° C. to 500° C. and an agitating means for mixing and agitating the FCC catalyst with waste plastics as a raw material.

The following actions are obtained due to the above-described constitution.

(1) Granular FCC catalyst is used as a thermal vehicle, waste plastics (a raw material) are loaded into the preliminarily heated FCC catalyst inside a reaction vessel, by which the granular FCC catalyst and the waste plastics are mixed and agitated to facilitate the heat transfer and reaction and the waste plastics are catalytically cracked at short times. Therefore, the apparatus is made simple in structure, even polyethylene composed of linear chain molecules difficult in decomposition is decomposable at a low temperature, carbonization is less likely to take place and decomposed residue is hardly produced.

(2) Granular FCC catalyst larger in specific surface area is used as a thermal vehicle, and waste plastics are brought into contact therewith in one reaction vessel to facilitate the heat transfer and reaction. Therefore, the process is simple and the energy efficiency is high.

In this instance, there is no particular restriction on a heating means, as long as it is able to heat a reaction vessel to a temperature from 350° C. to 500° C. For example, a heating means is used by which the reaction vessel is heated by radiation heat outside or inside the reaction vessel. Another heating means is available by which hot air is blown into a reaction vessel to heat the inner part of the reaction vessel. Further, an electric heater or the like may be used to heat the reaction vessel.

An agitating vane installed inside a reaction vessel may be used as an agitating means. Further, where the reaction vessel is a rotational cylinder, the FCC catalyst can be agitated by the rolling motion without using an agitating vane. Still further, an agitating media such as balls are placed into the reaction vessel. In addition, a reaction vessel is given as a tilted rotational cylinder, by which waste plastics loaded into the reaction vessel are moved axially by the rolling motion to effect agitation.

Since an explanation has been made for the FCC catalyst above, waste plastics and heating temperature above, they will not be explained here.

It is preferable that the apparatus for catalytically cracking waste plastics is provided with a loading apparatus which loads FCC catalyst mixed with Ca compounds inside the reaction vessel.

The following actions are obtained due to the above-described constitution.

(1) In catalytically decomposing to petroleum waste plastics having resins, such as PVC, in which chlorine atoms are contained, no independent dechlorination mechanism is needed. Further, hydrogen chloride generated by a dechlorination reaction is removed instantly by reaction with Ca compounds, thereby making it possible to obtain oil fractions extremely low in chlorine concentration. In other words, organic chlorine is still found at 1000 ppm when the thermal decomposition is conducted according to a conventional technology, while it is found only at a decreased content of 100 ppm according to the present invention.

(2) Since hydrogen chloride generated by a dechlorination reaction reacts with Ca compounds inside a reaction vessel and is fixed into the Ca compounds, it is possible to prevent corrosion or others resulting of the reaction vessel, a cracked gas pipe and others from hydrogen chloride.

The Ca compounds have been described above, the explanation of which will be omitted here.

The loading apparatus can be used as the loading apparatus for raw material which loads waste plastics into the reaction vessel. Conveyer and others can be used as the loading apparatus.

The following action can be obtained due to mixing granular iron compounds into FCC catalyst.

(1) Besides the FCC catalyst and Ca compounds, iron compounds are added and allowed to exist inside a reaction vessel, thereby attaining a remarkable improvement in the dechlorination rate and providing oil fractions extremely low in chlorine concentration of no more than 100 ppm, for example, 85 ppm.

(2) Addition of iron compounds makes it possible to prevent catalyst poisoning resulting from chlorine and extend the life of the FCC catalyst about 3 times, thereby providing a long-life FCC catalyst.

The iron compounds have been described above, the explanation of which will be omitted here.

Also it is preferable that the apparatus for catalytically cracking waste plastics is provided with a discharge mechanism for discharging at least the FCC catalyst outside the reaction vessel.

The following actions are obtained due to the above-described constitution.

(1) Since the apparatus is provided with a discharge mechanism for discharging the FCC catalyst outside a reaction vessel, the FCC catalyst or decomposed residue and the like inside the reaction vessel are discharged outside the reaction vessel after the catalytically cracking of waste plastics, by which the FCC catalyst inside the reaction vessel is adjusted to an appropriate quantity so that the waste plastics can be loaded. When waste plastics are loaded into a reaction vessel one after another, the reaction vessel is filled with the FCC catalyst and decomposed residue, thereby restricting a quantity of the waste plastics which can be loaded into the reaction vessel.

A screw conveyer and the like may be used as the discharge mechanism. The FCC catalyst, decomposed residue of waste plastics, or Ca compounds and iron compounds before or after reaction inside a reaction vessel can be discharged regularly from a discharge port formed at a predetermined site such as a lower part of the reaction vessel outside the reaction vessel by using the discharge mechanism such as a screw conveyor.

The discharged FCC catalyst and the like are separated from decomposed residue on the basis of a difference in specific gravity or by using a sieve and remaining portions are washed, thereby dissolving water-soluble calcium chloride in water to take out the FCC catalyst, Ca compounds and iron compounds prior to reaction. The thus taken out FCC catalyst, Ca compounds and iron compounds are regenerated, whenever necessary, after being dried. They can be, then, reused by supplementing Ca compounds. The concentration of calcium chloride in drain water after the FCC catalyst is washed is determined to calculate a quantity of Ca compounds used in a dechlorination reaction, and the thus calculated quantity may be supplemented accordingly.

When waste plastics are subjected to a repeated catalytic cracking inside a reaction vessel, decomposed residue accumulates inside the reaction vessel, and carbon attached to the surface of the FCC catalyst deactivates the FCC catalyst, thereby decreasing the decomposition performance. The deactivated FCC catalyst can be regenerated by heating under an oxygen atmosphere inside the reaction vessel to burn off the attached carbon. It is preferable to give an oxygen concentration of 1 to 20% and a heating temperature of 500 to 650° C. inside the reaction vessel. Further, it is preferable to give a heating time of 2 to 12 hours, depending on the heating temperature.

When the reaction vessel is heated under the above-described conditions, it is possible to burn off decomposed residue accumulated inside the reaction vessel and regenerate the FCC catalyst, without discharging the FCC catalyst or decomposed residue from the reaction vessel. The FCC catalyst can be regenerated inside the reaction vessel, by which waste plastics are subjected to a prolonged decomposition and gasification, without a separate mechanism for regenerating the FCC catalyst.

The present invention is the apparatus for catalytically cracking waste plastics discussed above, which is provided with a cooling mechanism for cooling and liquefying cracked gas generated by decomposition of the waste plastics.

The following actions are obtained due to the above-described constitution, in addition to the action discussed above.

(1) Waste plastics are facilitated for heat transfer and reaction, subjected to catalytically cracking and then cooled to obtain oil fractions. Therefore, even polyethylene (PE) difficult in decomposition is decomposable at a low temperature to obtain oil fractions at a high yield of 90%. The oil fractions can be recovered at 50% or more on a net yield basis, thereby attaining a high energy efficiency.

(2) Since even polyethylene composed of linear chain molecules is decomposable at a low temperature, wax is less likely to be produced, thereby providing oil fractions lower in flow-point (0° C. or lower).

In this instance, there is no particular restriction on a cooling means as long as it is able to cool cracked gas to a point lower than the dew point and liquefy it.

The present invention is the apparatus for catalytically cracking waste plastics discussed above, which is constituted so that the reaction vessel is a rotary kiln-type reaction vessel.

The following actions are obtained due to the above-described constitution, in addition to the action discussed above.

(1) The reaction vessel is the rotary kiln-type reaction vessel and waste plastics are loaded continuously, agitated by rolling motion, and brought into contact with the FCC catalyst to effect decomposition and gasification. Thus, the operation can be conducted continuously with a simple apparatus to attain a remarkable improvement in productivity.

As described so far, the following favorable effects can be obtained by a method for catalytically cracking waste plastics and an apparatus for catalytically cracking waste plastics according to the present invention.

According to the present invention, (1) a method for catalytically cracking waste plastics can be provided in which even polyethylene composed of linear chain molecules difficult in decomposition is decomposable at a low temperature and decomposed residue is hardly produced, with carbonization kept to a negligible level, since the granular FCC catalyst is used as a thermal vehicle, waste plastics (a raw material) are loaded into the high-temperature FCC catalyst inside a reaction vessel, the granular FCC catalyst is brought into contact with the waste plastics to facilitate the heat transfer and reaction, thereby catalytically cracking the waste plastics, and (2) a method for catalytically cracking waste plastics can be provided which is simple in process and high in energy efficiency, since the granular FCC catalyst large in specific surface area is used as a thermal vehicle to facilitate the heat transfer and reaction through contact with waste plastics.

According to the present invention, in addition to the effect discussed above, (1) a method for catalytically cracking waste plastics can be provided in which even polyethylene (PE) difficult in decomposition is decomposable at a low temperature to obtain oil fractions at a high yield of 90% and the oil fractions can be recovered at 50% or more on a net yield basis, thereby attaining a high energy efficiency, since waste plastics are facilitated for heat transfer and reaction, subjected to catalytically cracking and then cooled to obtain oil fractions, and (2) a method for catalytically cracking waste plastics can be provided in which wax is less likely to be produced, thereby providing oil fractions lower in flow-point (0° C. or lower), since even polyethylene composed of linear chain molecules is decomposable at a low temperature.

According to the present invention, in addition to the effect discussed above, (1) a method for catalytically cracking waste plastics can be provided in which oil fractions extremely low in chlorine concentration of 100 ppm can be obtained, since in catalytically cracking to petroleum waste plastics having resins, such as PVC, in which chlorine atoms are contained, no independent dechlorination step is needed and hydrogen chloride generated by a dechlorination reaction is also removed instantly by reaction with Ca compounds, and (2) a method for catalytically cracking waste plastics can be provided in which corrosion or others resulting from hydrogen chloride are prevented, since hydrogen chloride generated by a dechlorination reaction reacts with Ca compounds inside a reaction vessel and is fixed into the Ca compounds.

According to the present invention, in addition to the effect discussed above, (1) a method for catalytically cracking waste plastics can be provided in which besides the FCC catalyst and Ca compounds, iron compounds are added and allowed to exist inside a reaction vessel, thereby attaining a remarkable improvement in dechlorination rate and providing oil fractions extremely low in chlorine concentration of no more than 100 ppm, for example, 85 ppm, and (2) a method for catalytically cracking waste plastics can be provided in which addition of iron compounds enables to extend the life of the FCC catalyst about 3 times, thereby providing a long-life FCC catalyst.

According to the present invention, in addition to the effect discussed above, (1) a method for catalytically cracking waste plastics can be provided in which besides the FCC catalyst and Ca compounds, iron hydroxide (III) and others are added and allowed to exist inside a reaction vessel, thereby attaining a further improvement in the dechlorination rate and providing oil fractions extremely low in chlorine concentration of no more than 100 ppm, for example, 74 ppm.

According to the present invention, in addition to the effect discussed above, (1) waste plastics are subjected to decomposition and gasification in an atmosphere in which an inert gas is introduced into a reaction vessel and they are heated and decomposed in a state that the reaction vessel is purged inside by the inert gas or oxygen is scarce, thereby making it possible to prevent generation of dioxins and contributing to the environmental protection.

According to the present invention, in addition to the effect described above, (1) a method for catalytically cracking waste plastics can be provided in which the operation can be conducted continuously to attain a remarkable improvement in productivity, since the reaction vessel is a rotary kiln-type reaction vessel and waste plastics are loaded continuously, agitated by rolling motion, and brought into contact with the FCC catalyst to effect decomposition and gasification.

According to the present invention, in addition to the effect discussed above, (1) Waste catalysts (industrial waste), the treatment of which poses a problem, can be utilized effectively. Further, since waste catalysts are quite low in cost as compared with a new catalyst, a method for catalytically cracking waste plastics is provided in which waste plastics can be subjected to decomposition at a low cost.

According to the present invention, (1) an apparatus for catalytically cracking waste plastics can be provided in which the structure is simplified, even polyethylene composed of linear chain molecules difficult in decomposition is decomposable at a low temperature, and decomposed residue is hardly produced, with carbonization kept to a negligible level, since the granular FCC catalyst is used as a thermal vehicle and waste plastics (a raw material) are loaded into the high-temperature FCC catalyst inside a reaction vessel, the granular FCC catalyst and the waste plastics are mixed and agitated to facilitate the heat transfer and reaction and catalytically cracking the waste plastics, and (2) an apparatus for catalytically cracking waste plastics can be provided which is simple in process and high in energy efficiency, since the granular FCC catalyst large in specific surface area is used as a thermal vehicle to facilitate the heat transfer and reaction through contact with waste plastics.

According to the present invention, in addition to the effect discussed above, (1) an apparatus for catalytically cracking waste plastics can be provided in which even polyethylene (PE) difficult in decomposition is decomposable at a low temperature to obtain oil fractions at a high yield of 90%, and the oil fractions can be recovered at 50% or more on a net yield basis, thereby attaining a high energy efficiency, since waste plastics are facilitated for heat transfer and reaction, subjected to catalytically cracking, and then cooled to obtain oil fractions, and (2) an apparatus for catalytically cracking waste plastics can be provided in which wax is less likely to be produced, thereby providing oil fractions lower in flow-point (0° C. or lower), since even polyethylene composed of linear chain molecules is decomposable at a low temperature.

According to the present invention, in addition to the effect discussed above, (1) an apparatus for catalytically cracking waste plastics can be provided in which the operation can be conducted continuously with a simple apparatus to attain a remarkable improvement in productivity, since the reaction vessel is a rotary kiln-type reaction vessel and waste plastics are loaded continuously, agitated by rolling motion, and brought into contact with the FCC catalyst to effect decomposition and gasification.

DESCRIPTION OF SYMBOLS

Figure 1:
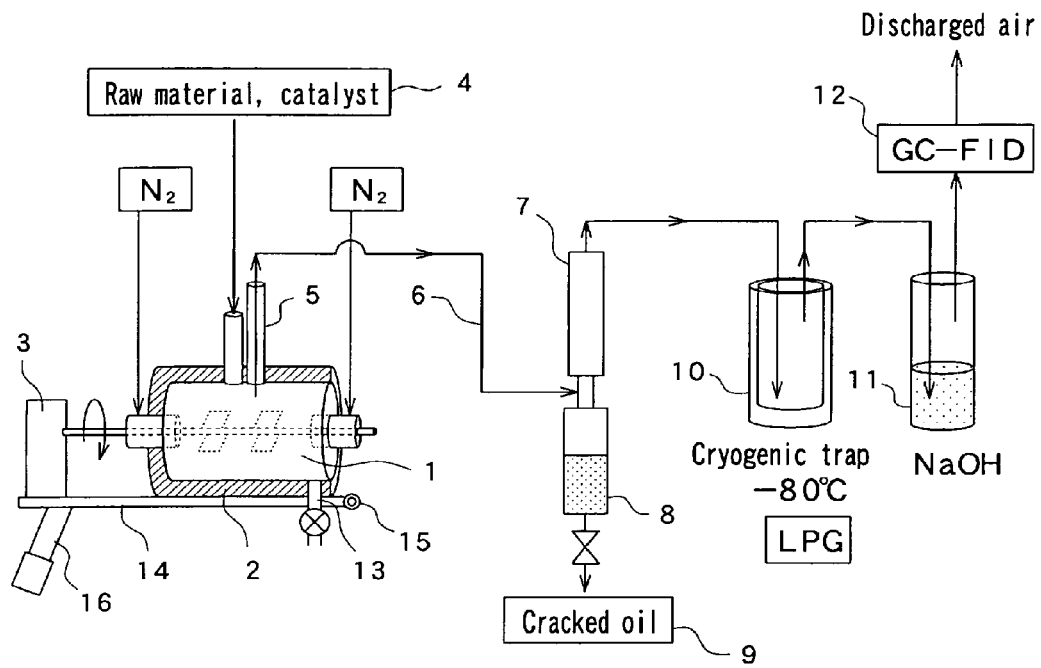
FIG. 1 is a schematic view illustrating a method for catalytically cracking waste plastics and the apparatus therefore (reaction process) according to one example of the present invention.

1: reaction vessel
2: heater
3: agitator
4: loading port for raw materials
5: cracked gas discharging port
6: cracked gas pipe
7: cooling mechanism
8: oil fraction storage tank
9: oil fraction (cracked oil)
10: cryogenic trap (−80° C.)
11: NaOH trap
12: GC-FID
13: discharge port
14: base
15: pivotally supporting portion
16: tilting device
21: rotary kiln-type reaction vessel
22: heater
22a: combustor
24: loading port for raw materials
25: anterior fixing portion
25a: raw material feeding mechanism
26: FCC waste catalyst and others inside reaction vessel
27: cooling mechanism
28: oil fraction storage tank
29: combustible gas (fuel gas)
30: posterior fixing portion
31: discharged substance storing portion

DETAILED DESCRIPTION OF THE INVENTION

Hereinafter, an explanation will be made for the best mode for carrying out the present invention by referring to drawings. In description of embodiments, waste catalyst (FCC waste catalyst) which is discharged from petroleum refinery plants, is used as FCC catalyst.

EXAMPLES

The First Embodiment

FIG. 1 is a schematic view of an apparatus for catalytically cracking waste plastics according to the first embodiment of the present invention.

In FIG. 1, the numeral 1 denotes a horizontal-type reaction vessel shaped in a cylindrical form and having a heater 2 as heating means and a rotary-vane type agitator 3 as agitating means. The heater 2 is used to heat granular FCC waste catalysts loaded from a material port 4 up to a temperature range from 300° C. to 500° C., preferably from 400° C. to 480° C. and more preferably from 410° C. to 430° C. In this embodiment, the heater 2 is such a heater that can be easily controlled for temperatures, for example, an electric heater. Waste plastics which are finely degraded into granules to flakes are loaded into granular FCC waste catalysts heated to a high temperature inside the reaction vessel 1 and mixed and agitated by the agitator 3 to dredge the waste plastics with the high-temperature granular FCC waste catalysts, thereby allowing heating/decomposition reactions to proceed. In this embodiment, the agitator 3 is rotated at 50 rpm, thereby mixing and agitating the waste plastics loaded from the material port 4 with the granular FCC waste catalysts.

The numeral 5 denotes a cracked gas discharging port, and gas generated by catalytically cracking of waste plastics is sent out from the cracked gas discharging port 5. The numeral 6 is a cracked gas pipe. In this embodiment, cracked gas is sent out, with $N_2$ gas used as a carrier, and liquefied by a cooling mechanism 7 in which water and others is used as a refrigerant and available as an oil fraction (cracked oil). The thus obtained oil fraction (cracked oil) is stored at an oil fraction storage tank 8 and taken out as cracked oil 9.

$N_2$ gas is introduced into the reaction vessel 1 not only because it is used as a carrier gas for the cracked gas but also because oxygen concentration inside the reaction vessel 1 is reduced. A rare gas such as argon may be used in place of $N_2$ gas.

The numeral 10 denotes a cryogenic trap, which recovers an LPG fraction not liquefied by the cooling mechanism 7 through a cryogenic trap (−80° C.) using dry ice. The numeral 11 denotes a NaOH trap, which is to trap organic matter produced by decomposition. The numeral 12 denotes GC-FID (gas chromatography-flame ionization detector), which is to make a quantitative analysis of low boiling-point substances such as methane and ethane not liquefied by the cryogenic trap 10.

The numeral 13 denotes a discharge port formed at a lower part on one end of the reaction vessel 1, 14 denotes a base for placing the reaction vessel 1 and the agitator 3, 15 denotes a pivotally supporting portion by which one end of the base 14 is pivotally supported, 16 is a tilting device such as a pusher for elevating the other end of the base 14 arranged at a lower part of the base 14 to tilt the base 14.

When the tilting device 16 is driven to tilt the base 14 and open a discharge port 13 to rotate the agitator 3, FCC waste catalysts and decomposed residue are displaced axially toward the reaction vessel 1, and discharged from the discharge port 13. The tilting device 16 and the agitator 3 constitute a discharge mechanism in the present embodiment.

Since the discharge mechanism is provided, FCC waste catalysts and others inside the reaction vessel 1 can be controlled to an appropriate level at which waste plastics can be loaded, thereby providing a stable operation.

Hereinafter, the present invention will be explained more specifically by referring to the following examples. The present invention shall not be construed to be restricted to these embodiments. Also waste plastics such as polyethylene, polypropylene and others are respectively processed scrap of waste plastics.

(Experiment 1)

The catalytically cracking apparatus described in the first embodiment 1 is used to carry out the following processes, namely, 10 g of granular FCC waste catalyst is heated to 420° C. by actuating a heater 2 inside a reaction vessel 1, 75 g of granular to flake-shaped polyethylene (PE) is loaded into the high-temperature granular FCC waste catalyst from a material port 4, an agitator 3 is rotated at 50 rpm, the granular FCC waste catalyst is mixed and agitated with granular to flake-shaped polyethylene (PE), the polyethylene (PE) is dredged with the high-temperature granular FCC waste catalyst, thereby facilitating heating/decomposition reactions. The decomposition reaction is set to proceed at 420° C. under an atmospheric pressure. Cracked gas is sent into a cooling mechanism 7, with N$_2$ gas (100 mL/min) being used as a carrier, then, cooled and liquefied to obtain oil fractions.

Figure 2:
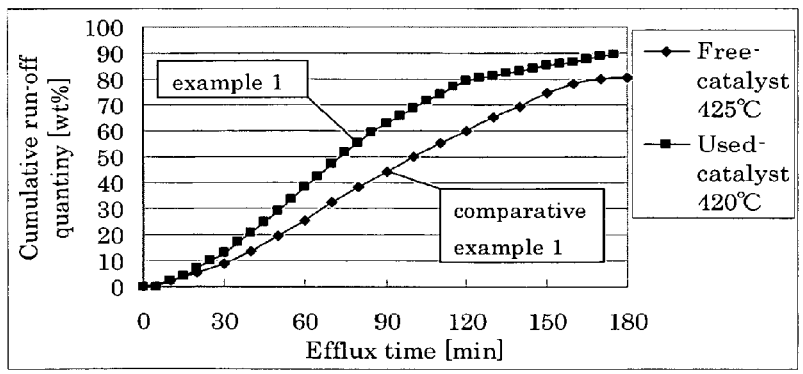
FIG. 2 is a graph illustrating a relationship between the oil fraction efflux time and the cumulative run-off quantity (weight %) in a method for catalytically cracking waste plastics according to one example of the present invention.

FIG. 2 shows a relationship between the efflux time and the cumulative run-off quantity (weight %) of decomposition products with (Example 1) or without the FCC waste catalyst (Comparative Example 1) when polyethylene (PE) is used as a raw material. Further, the reaction temperature in Comparative Example 1 is elevated by 5° C. and to 425° C., as compared with the reaction temperature in Example 1 in place of not using the FCC waste catalyst.

As apparent from FIG. 2, the use of the FCC waste catalyst (FCC (U)) results in a higher run-off speed and a slightly greater yield, despite the fact that the reaction temperature is lowered by 5° C. Further, the use of the FCC waste catalyst (FCC (U)) hardly produces wax or does not adversely affect the apparatus.

Figure 3:
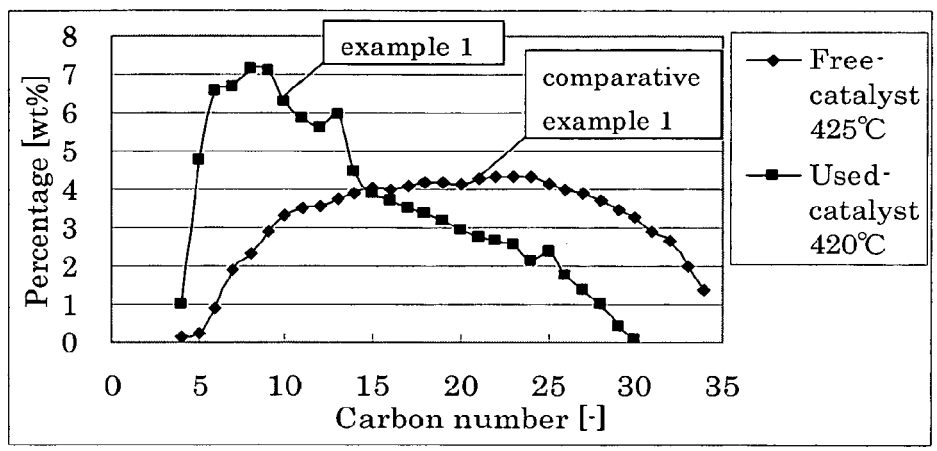
FIG. 3 is a graph illustrating a carbon number distribution of products in a method for catalytically cracking waste plastics according to one example of the present invention.

FIG. 3 shows a carbon number distribution of cracked oil. The carbon number distribution of cracked oil is determined by GC-FID.

As apparent from FIG. 3, the use of the FCC waste catalyst (FCC (U)) results in a smaller molecular weight of products. This result is shown in Table 1 in terms of material balance. As indicated in Table 1, naphtha, kerosene and light oil fractions are increased to raise the utility value. Further, there is substantially no residue or no carbonization found. Table 2 shows the structure of a product. As apparent from Table 2, the use of the FCC waste catalyst (FCC(U)) increases i-paraffin and aromatic compounds, producing various types of products.

TABLE 1

Material balance

|  | Free of catalyst [%] | FCC waste catalyst [%] |
|---|---|---|
| Dry gas (C1-C2) | 1.5 | 2.9 |
| LPG(C3-C4) | 2.3 | 5.2 |
| Naphtha (C5-C8) | 2.7 | 21.5 |
| Kerosene (C9-C12) | 13.1 | 20.8 |
| Light oil (C13-C24) | 37.8 | 36.6 |
| Heavy oil (C25-) | 29.9 | 12.1 |
| Coke | 12.6 | 0.9 |

* The figure given in the column of catalyst-free coke indicates a quantity of residue.

TABLE 2

Component ratio of products

|  | Free of catalyst [%] | FCC waste catalyst [%] |
|---|---|---|
| n-paraffin | 60 | 11.0 |
| Olefin | 30 | 22.5 |
| i-paraffin | 0 | 11.5 |
| Aromatic compounds | 1-2 | 45.0 |

(Experiment 2)

Evaluation is made for a relationship between the efflux time and the cumulative run-off quantity (weight %) of decomposition products, a carbon number distribution of cracked oil and a quantity of cracked gas produced under the conditions the same as those in Experiment 1 except that the reaction temperature is set at three levels, namely, 410° C., 420° C. and 430° C. It is noted that the cumulative run-off quantity (weight %) of decomposition products and the carbon number distribution of cracked oil are determined similarly as in Example 1.

Figure 4:
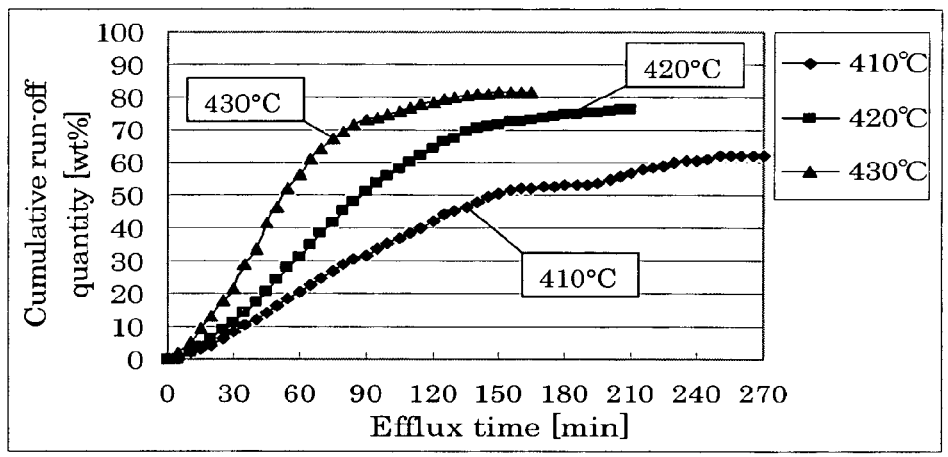
FIG. 4 is a graph illustrating a relationship between the oil fraction efflux time and the cumulative run-off quantity (weight %) in a method for catalytically cracking waste plastics (the reaction temperature is changed at three different levels) according to another example of present invention.

FIG. 4 shows a relationship between the efflux time and the cumulative run-off quantity (weight %) of decomposition products.

Figure 5:
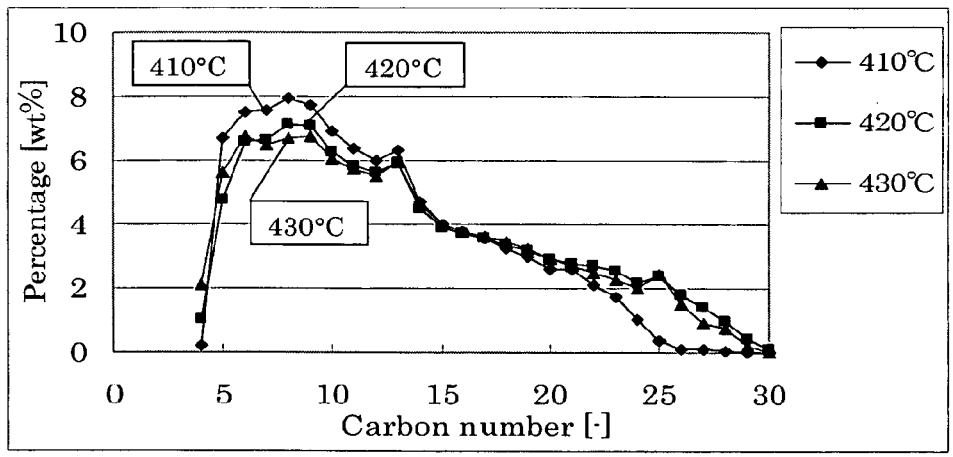
FIG. 5 is a graph illustrating a carbon number distribution of products in a method for catalytically cracking waste plastics (the reaction temperature is changed at three different levels) according to another example of the present invention.
Figure 6:
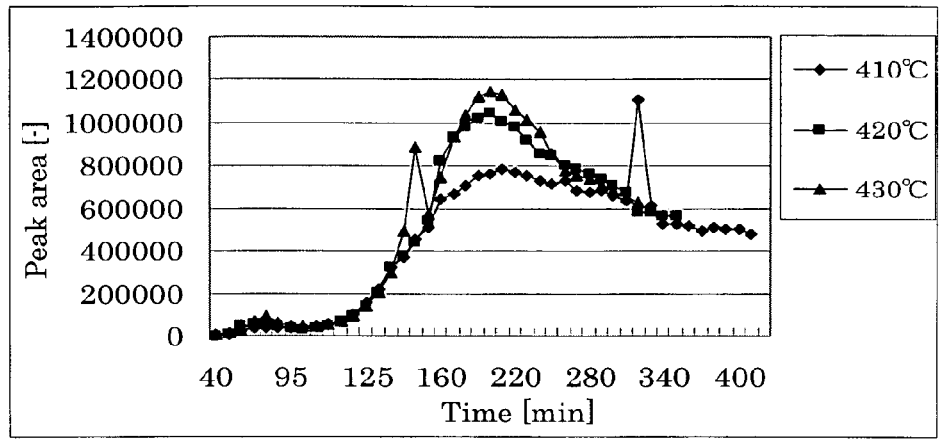
FIG. 6 is a graph illustrating a change in gas production in a method for catalytically cracking waste plastics (the reaction temperature is changed at three different levels) according to another example of the present invention.

As apparent from FIG. 4, cracked oil is obtained at a higher yield according to a higher reaction temperature, and the cracked oil flows out at a greater speed. Further, as apparent from FIG. 6, gas is produced at an increased quantity, and decomposition takes place more easily. However, as apparent from the carbon number distribution in FIG. 5, compounds having a greater molecular weight increase in proportion to an increase in reaction temperature. This leads to an increased quantity of wax, which is not desirable. As described so far, a lower reaction temperature results in a smaller quantity of wax but also results in a longer decomposition time to cause an increased quantity of residue. In contrast, a higher reaction temperature results in a greater yield but may result in an increased wax fraction and cause carbonization. Therefore, catalytic cracking to petroleum is preferable in which the FCC waste catalyst (FCC(U)) is used at a reaction temperature of 420° C.

(Experiment 3)

Evaluation is made for a relationship between the efflux time and the cumulative run-off quantity (weight %) of decomposition products, a carbon number distribution of cracked oil and a quantity of gas produced under the conditions the same as those in Experiment 1 except that the FCC waste catalyst (FCC(U)) is set at three different quantities, namely, 5 g, 10 g and 20 g.

Figure 7:
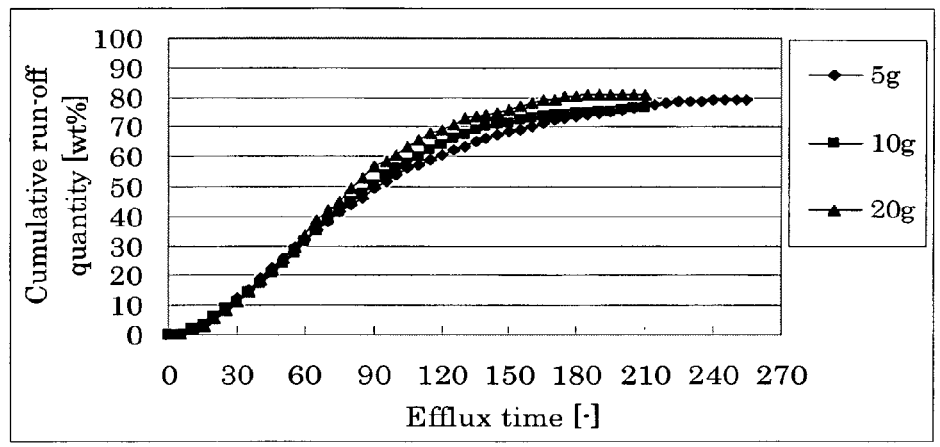
FIG. 7 is a graph illustrating a relationship between the oil fraction efflux time and the cumulative run-off quantity (weight %) in a method for catalytically cracking waste plastics (FCC waste catalyst (FCC(U)) is used at three different quantity levels) according to another example of the present invention.
Figure 8:
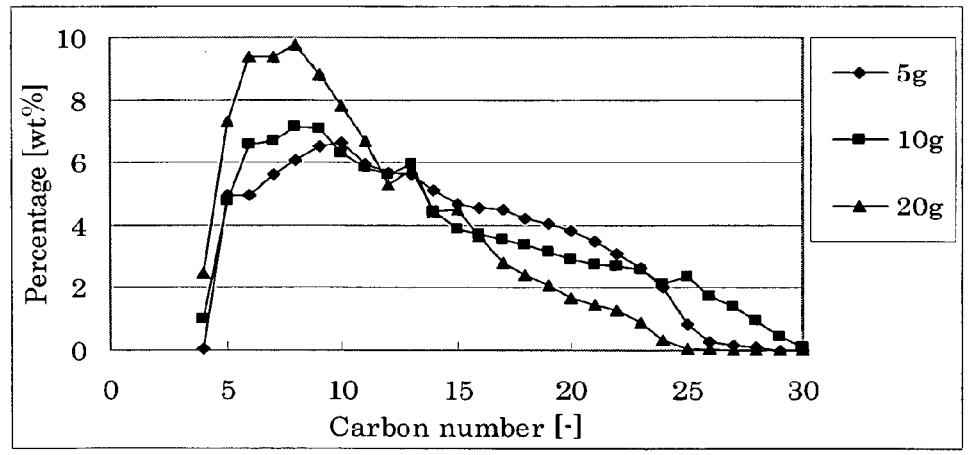
FIG. 8 is a graph illustrating a carbon number distribution of products in a method for catalytically cracking waste plastics (FCC waste catalyst (FCC(U)) is used at three different quantity levels) according to another example of the present invention.
Figure 9:
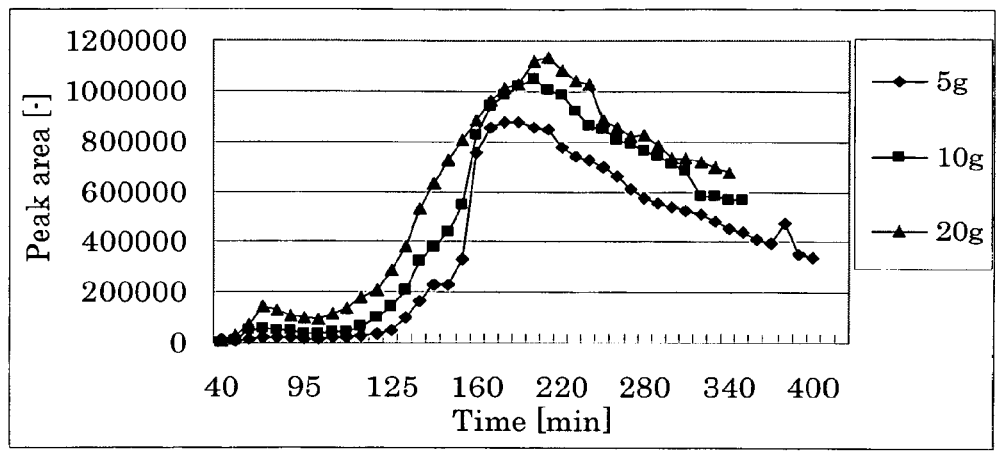
FIG. 9 is a graph illustrating a change in gas production in a method for catalytically cracking waste plastics (FCC waste catalyst (FCC(U)) is used at three different quantity levels) according to another example of the present invention.

FIG. 7 shows a relationship between the efflux time and the cumulative run-off quantity (weight %) of decomposition products. FIG. 8 shows a carbon number distribution of cracked oil. FIG. 9 shows a change in the quantity of gas production.

These results have revealed that when the FCC waste catalyst (FCC (U)) is changed in quantity in a range from 5 g to 20 g, a quantity of cracked oil is hardly changed but when the FCC waste catalyst (FCC(U)) is in a quantity of 5 g, it undergoes decomposition for a longer time. Further, as apparent from FIG. 8, products are lower in molecular weight as the FCC waste catalyst (FCC (U)) is fed in an increased quantity. This finding may be due to the fact that an increased quantity of the catalyst results in a larger area in contact with polyethylene (PE), a raw material, thereby more easily causing the decomposition reaction. It is likely that where the FCC waste catalyst (FCC(U)) is in a quantity of 5 g, it undergoes a longer decomposition due to a smaller area in contact with the raw material and also results in greater molecular weight of products. On the basis of these findings, it is effective to use the FCC waste catalyst (FCC(U)) in a quantity exceeding 10 g, namely, 13 mass % or more with respect to the mass of waste plastics.

(Experiment 4)

Raw materials are subjected to catalytic cracking to petroleum under the same conditions as those in Experiment 1 except that these raw materials are polyethylene (PE), polypropylene (PP) and polystyrene (PS) at the respective quantities of 75 g.

Figure 10:
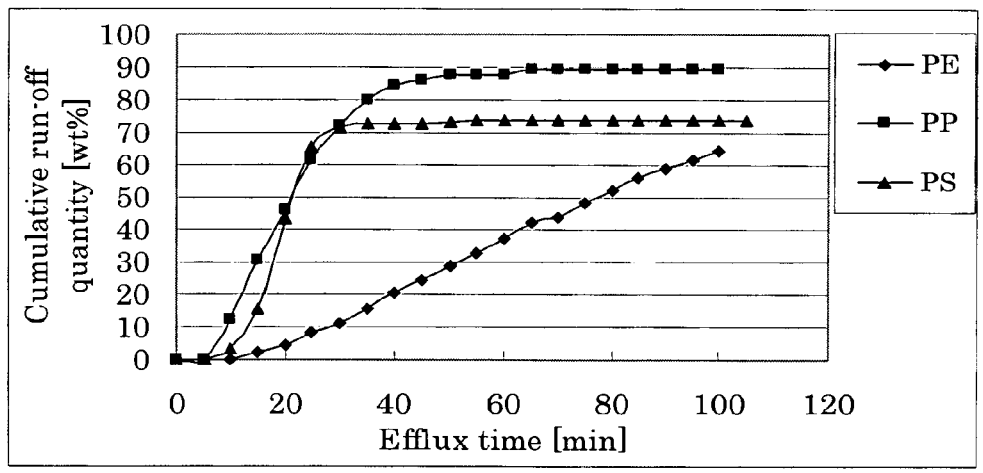
FIG. 10 is a graph illustrating a relationship between the oil fraction efflux time and the cumulative run-off quantity (weight %) in a method for catalytically cracking waste plastics (the raw material is changed to each of PE, PP and PS) according to another example of the present invention.
Figure 11:
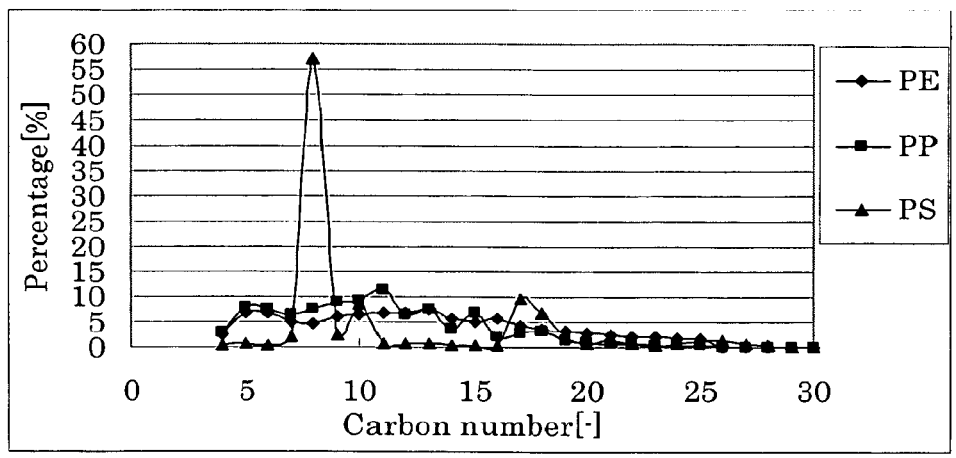
FIG. 11 is a graph illustrating a carbon number distribution of products in a method for catalytically cracking waste plastics (the raw material is changed to each of PE, PP and PS) according to another example of the present invention.
Figure 12:
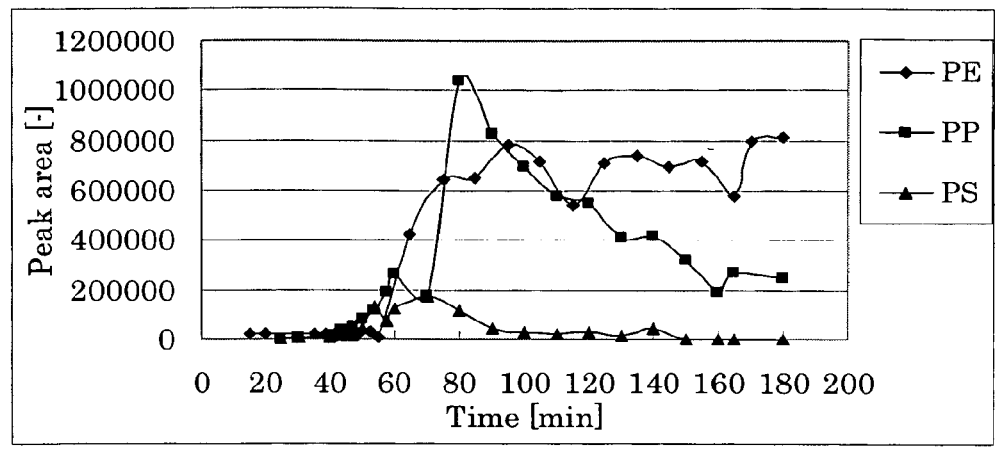
FIG. 12 is a graph illustrating a change in gas production in a method for catalytically cracking waste plastics (the raw material is changed to each of PE, PP and PS) according to another example of the present invention.

FIG. 10 shows a relationship between the efflux time and the cumulative run-off quantity (weight %) of decomposition products. FIG. 11 shows a carbon number distribution of cracked oil. FIG. 12 shows a change in gas production.

As apparent from FIG. 10, polypropylene (PP) and polystyrene (PS) can be decomposed without a catalyst at a reaction temperature below 400° C. and therefore undergo decomposition all at once. However, polystyrene (PS) entails a great quantity of residue and resembles charcoal, from which carbonization reaction has occurred. This finding may be due to the fact that polystyrene (PS) is decomposed at a low temperature and substances responsible for carbonization are aromatic compounds, therefore, polystyrene (PS) having many benzene rings in structure is subjected to carbonization. In view of this finding, it is necessary to carry out the reaction at a lower temperature in catalytically cracking polystyrene (PS) alone to petroleum.

Further, as shown in FIG. 11, products are quite different in composition due to a difference in structure of each raw material used. While polyethylene (PE) and polypropylene (PP) are distributed evenly, polystyrene (PS) mostly contains a carbon number of 8, which may be an aromatic compound easily removable from carbon chains. In contrast, as illustrated in FIG. 12, gas is produced at a greater quantity when polyethylene (PE) and polypropylene (PP) are used. This may be due to the fact that polypropylene (PP) has many methyl groups in its structure to easily produce methane.

(Experiment 5)

Raw materials are subjected to catalytic cracking to petroleum under the same conditions as those in Experiment 1 except that these raw materials are a mixed material composed of 25 g of polyethylene (PE), 25 g of polypropylene (PP) and 25 g of polystyrene (PS), a total of 75 g.

Figure 13:
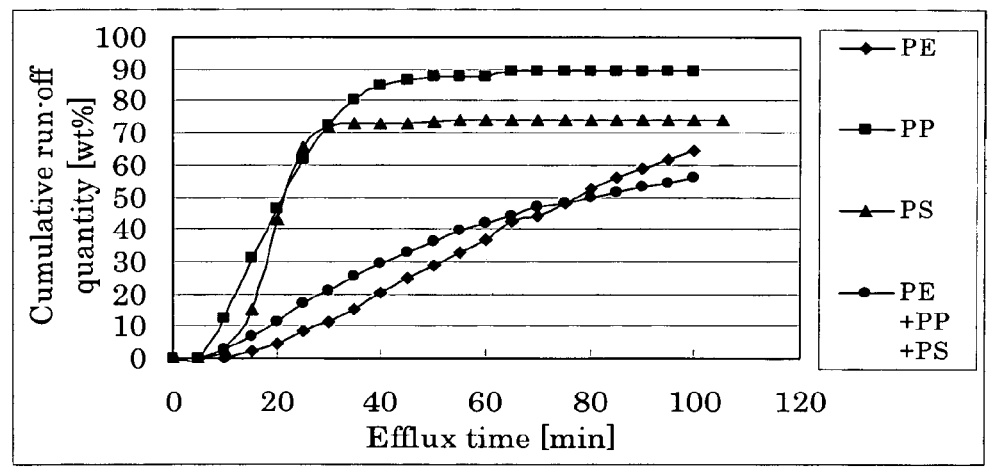
FIG. 13 is a graph illustrating a relationship between the oil fraction efflux time and the cumulative run-off quantity (weight %) in a method for catalytically cracking waste plastics (the raw material used is a mixture of PE, PP and PS) according to another example of the present invention.
Figure 14:
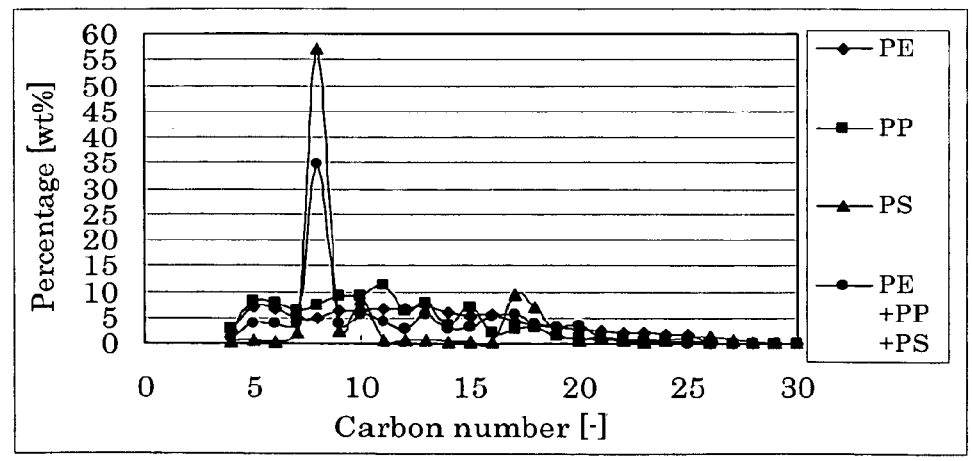
FIG. 14 is a graph illustrating a carbon number distribution of products in a method for catalytically cracking waste plastics (the raw material used is a mixture of PE, PP and PS) according to another example of the present invention.
Figure 15:
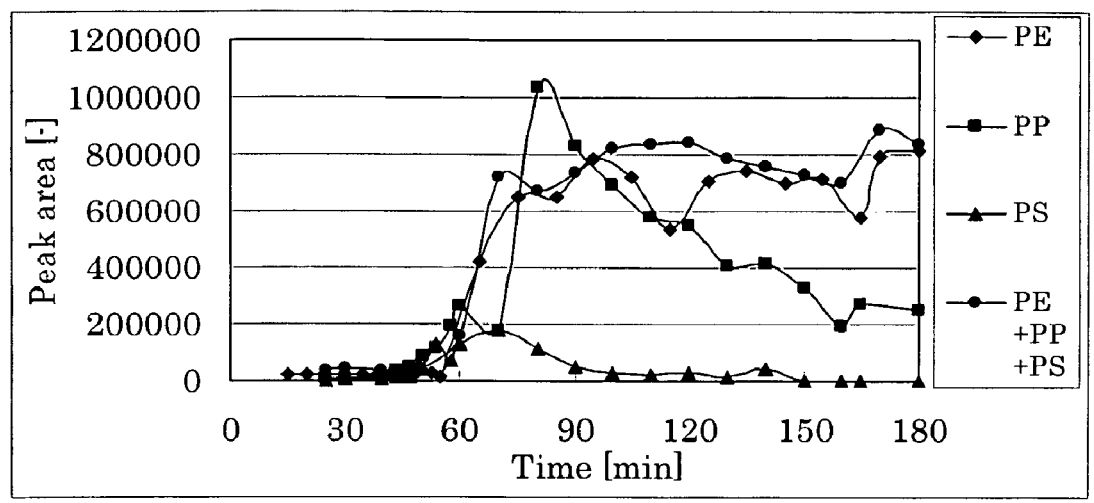
FIG. 15 is a graph illustrating a change in gas production in a method for catalytically cracking waste plastics (the raw material used is a mixture of PE, PP and PS) according to another example of the present invention.

FIG. 13 shows a relationship between the efflux time and the cumulative run-off quantity (weight %) of decomposition products. FIG. 14 shows a carbon number distribution of cracked oil. FIG. 15 shows a change in gas production.

As apparent from FIG. 13, when the mixed material is used, a yield is decreased as compared with a single raw material. Further, as apparent from FIG. 14, the carbon number distribution of products is greatly influenced by polystyrene (PS) and polypropylene (PP), and flows out in the order of easily decomposable substances (PS→PP→PE). Therefore, residual oil and residue are polyethylene (PE). Since polyethylene (PE) flows out as residual oil abundantly, it can be obtained at a great yield by elevating the reaction temperature or increasing the quantity of the FCC waste catalyst (FCC (U)). Although the yield is not necessarily great, polyethylene (PE)-abundant cracked oil which is obtained at a late stage of decomposition is also free of a wax fraction. Thus, the FCC waste catalyst (FCC (U)) is found effective and waste plastics can be effectively decomposed to petroleum when the mixed material is used.

(Experiment 6)

Oil fractions are collected under the same conditions as those in Experiment 1 except that 440 g of granular FCC waste catalyst is heated to 420° C. by actuating a heater 2 inside a reaction vessel 1, and 75 g of granular or flake polyethylene (PE) is loaded into this high-temperature granular FCC waste catalyst from a material port 4, thereby allowing the decomposition reaction to proceed (Example 6).

Further, oil fractions are collected under the same conditions as those in Example 6 except that in place of 440 g of the FCC waste catalyst, a mixture of 500 g of sands with 10 g of the FCC waste catalyst (13 wt % with respect to waste plastics) is heated, to which 75 g of polyethylene (waste plastics) is added (Comparative Example 2).

Still further, oil fractions are collected under the same conditions as those in Example 6 except that in place of 440 g of the FCC waste catalyst, a mixture of 500 g of sands with 50 g of the FCC waste catalyst (67 wt % with respect to waste plastics) is heated, to which 75 g of polyethylene (waste plastics) is added (Comparative Example 3).

Figure 16:
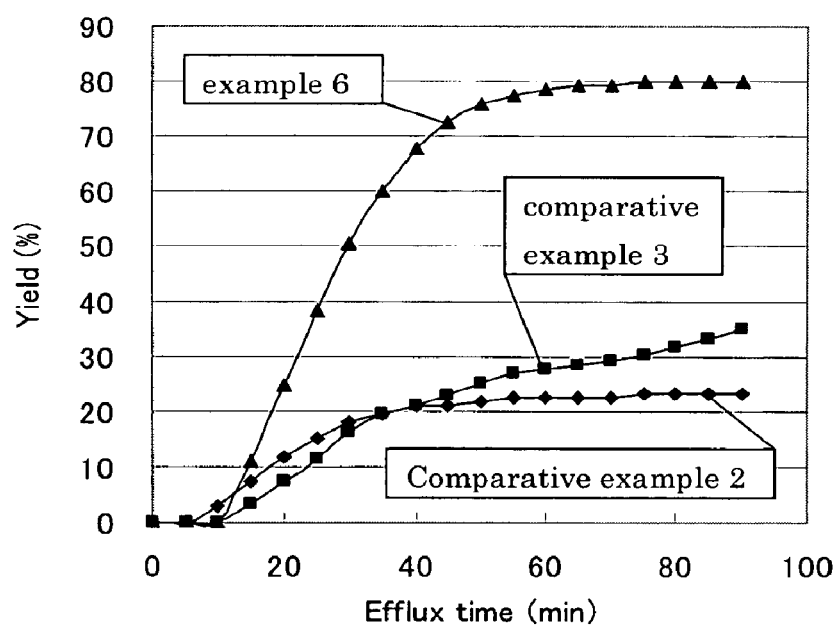
FIG. 16 is a view illustrating yield of oil fraction of 90 minutes duration since waste plastics are loaded.

Table 3 is a list showing a mass (g) of cracked oil and LPG fraction and a yield(%) of oil fractions obtained for 95 minutes after waste plastics are loaded. FIG. 16 is a graph showing the yield of oil fractions obtained for 90 minutes after waste plastics are loaded. It is noted that the yield of oil fractions is expressed by (mass of cracked oil+mass of LPG fraction)/(mass of waste plastics)×100(%).

TABLE 3

| | Catalyst (g) | Sand (g) | Cracked oil (g) | LPG fraction (g) | Oil yield (%) |
|---|---|---|---|---|---|
| Example 6 | 440 | 0 | 45.0 | 17.4 | 83.2 |
| Comparative Example 2 | 10 | 500 | 13.0 | 4.3 | 23.1 |
| Comparative Example 3 | 50 | 500 | 20.1 | 7.3 | 36.5 |

It is apparent from Table 3 and FIG. 16 that in Example 6, oil fractions are collected at a greater quantity as compared with Comparative Examples 2 and 3 where sands are used as thermal vehicle, and a yield of 80% is attained in 90 minutes.

It is apparent that oil fractions are obtained at a higher yield according to the present Example, as compared with a case disclosed in Patent Document 1 where sands are used to heat and decompose waste plastics.

(Experiment 7)

Raw materials are subjected to catalytic cracking to petroleum under the same conditions as those in Experiment 1 except that the raw material is a mixed material composed of 67.5 g of polypropylene(PP) and 7.5 g of polyvinylchloride (PVC).

Figure 17:
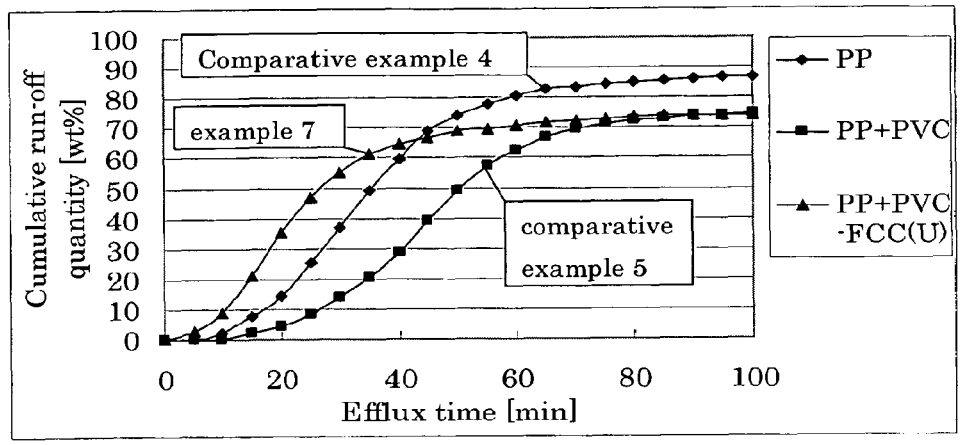
FIG. 17 is a graph illustrating a relationship between the oil fraction efflux time and the cumulative run-off quantity (weight %) in a method for catalytically cracking waste plastics (the raw material used is a mixture of PP with PVC) according to another example of the present invention.
Figure 18:
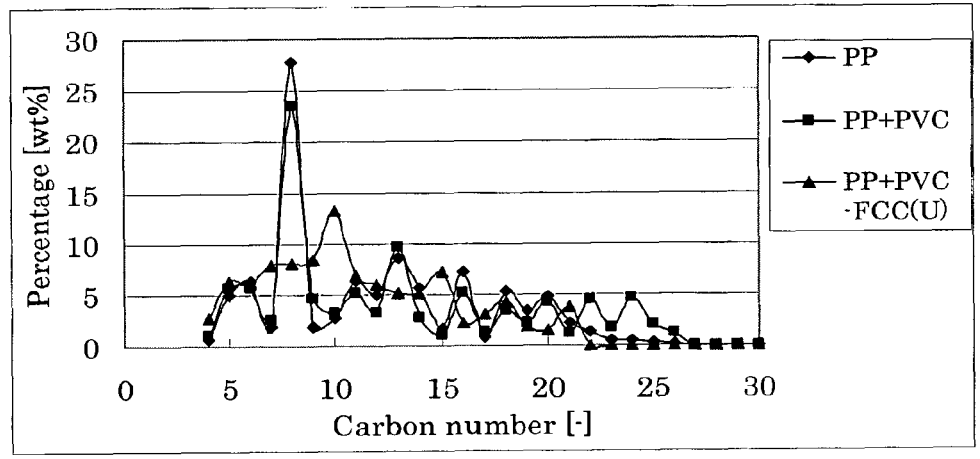
FIG. 18 is a graph illustrating a carbon number distribution of products in a method for catalytically cracking waste plastics (the raw material used is a mixture of PP with PVC) according to another example of the present invention.
Figure 19:
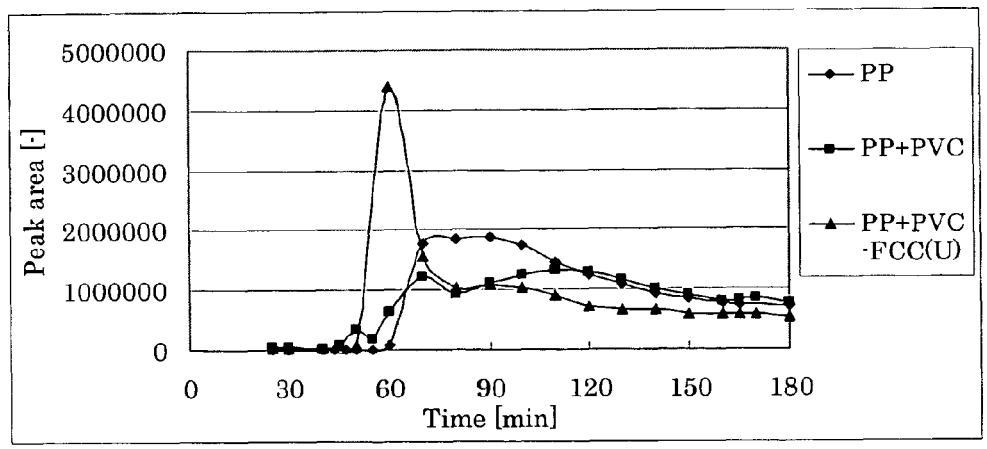
FIG. 19 is a graph illustrating a change in gas production in a method for catalytically cracking waste plastics (the raw material used is a mixture of PP with PVC) according to another example of the present invention.

FIG. 17 shows a relationship between the efflux time and the cumulative run-off quantity (weight %) of decomposition products in cases where a raw material composed of polypropylene (PP) alone is decomposed at 425° C. without using the FCC waste catalyst (Comparative Example 4), where a mixture of polypropylene (PP) with polyvinyl chloride (PVC) is decomposed at 425° C. without using the FCC waste catalyst (Comparative Example 5) and where a mixture of polypropylene (PP) with polyvinyl chloride (PVC) is decomposed at 420° C. by using the FCC waste catalyst (Example 7). FIG. 18 shows a carbon number distribution of cracked oil. FIG. 19 shows a change in gas production.

These results have revealed that chlorine content in the structure of waste plastics, which is a raw material, is mostly converted into hydrogen chloride. Further, a yield is found to decrease when polyvinyl chloride (PVC) is present in a raw material. It has also been confirmed that a charcoal-like solid substance remains inside a reaction vessel 1, coming out in a mixture with cracked oil during the reaction. The charcoal-like solid substance mixed with cracked oil can be removed by means such as percolation and others. This finding makes it possible to obtain clean cracked oil. Still further, since the volume is changed by 60% as compared with Comparative Example 4 where no PVC is mixed, PVC may easily undergo carbonization, which is likely to affect the yield. However, the use of the FCC waste catalyst (FCC(U)) makes it possible to reduce quantities of residual oil and residue, thereby facilitating the decomposition and effectively preventing the occurrence of carbonization when waste plastics mixed with polyvinyl chloride (PVC) are used.

In contrast, as shown in FIG. 18, the use of the FCC waste catalyst (FCC (U)) makes the carbon number distribution of products even. This finding is due to a difference in the reaction mechanism. The carbon numeral 8 is found to be disproportionately distributed in the radical chain reaction (free of catalyst). When the FCC waste catalyst (FCC(U)) is used, ion reaction may take place to result in various types of products. As shown in FIG. 19, the use of the FCC waste catalyst (FCC(U)) produces a great quantity of gas at one point. In principle, since polypropylene (PP) can be easily decomposed even without catalysts at a temperature below 400° C., it is likely that polypropylene undergoes the reaction all at once as a result of accelerated decomposition by the FCC waste catalyst (FCC(U)), thereby generating a great quantity of gas. This fact can be estimated by referring to a greater run-off quantity at the time of starting the flow.

It has also been confirmed that no dioxin is generated inside the reaction vessel, which is due to a decreased oxygen concentration inside the reaction vessel for decomposing and gasifying polyvinyl chloride (PVC) by introduction of $N_2$ gas into the reaction vessel.

(Experiment 8)

Raw materials are subjected to catalytic cracking to petroleum under the same conditions as those in Example 1 except that for the purpose of removing hydrogen chloride, calcium oxide (CaO), calcium carbonate ($CaCO_3$) and calcium hydroxide ($Ca(OH)_2$) are separately used at the respective quantities of 7.5 g to give a mixed raw material comprising 67.5 g of polypropylene (PP) and 7.5 g of polyvinyl chloride (PVC).

Figure 20:
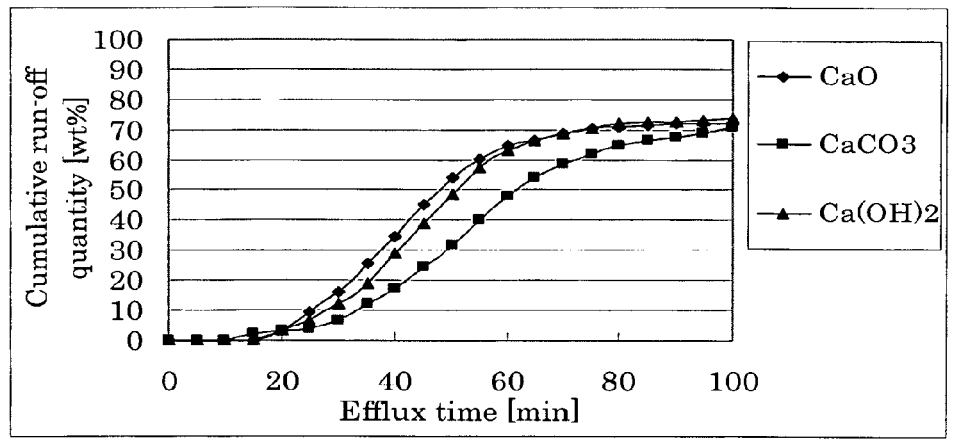
FIG. 20 is a graph illustrating a relationship between the oil fraction efflux time and the cumulative run-off quantity (weight %) in a method for catalytically cracking waste plastics (the raw material used is a mixture of PP with PVC and a Ca compound to be added is changed to each of CaO, $CaCO_3$ and $Ca(OH)_2$) according to another example of the present invention.
Figure 21:
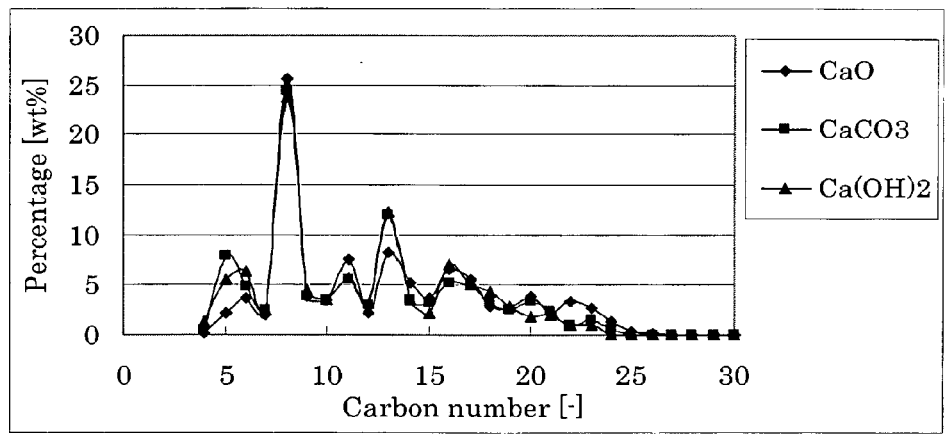
FIG. 21 is a graph illustrating a carbon number distribution of products in a method for catalytically cracking waste plastics (the raw material is a mixture of PP with PVC and a Ca compound to be added is changed to each of CaO, $CaCO_3$ and $Ca(OH)_2$) according to another example of the present invention.
Figure 22:
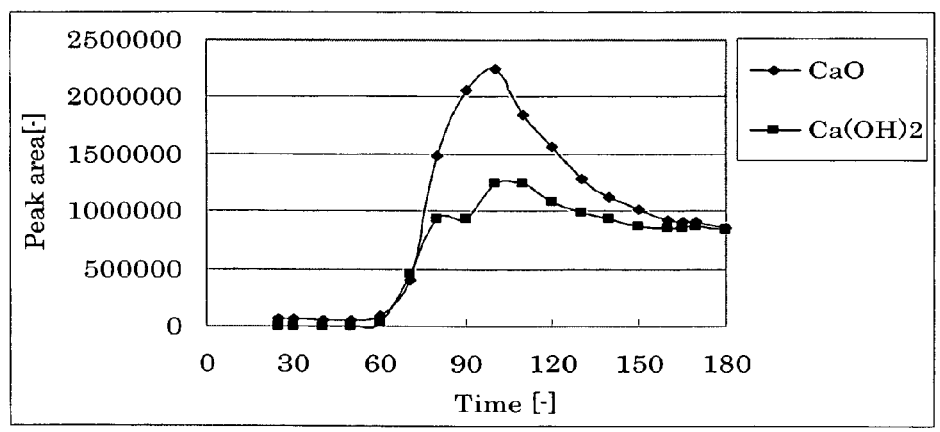
FIG. 22 is a graph illustrating a change in gas production in a method for catalytically cracking waste plastics (the raw material is a mixture of PP with PVC and a Ca compound to be added is changed to each of CaO, $CaCO_3$ and $Ca(OH)_2$) according to another example of the present invention.
Figure 23:
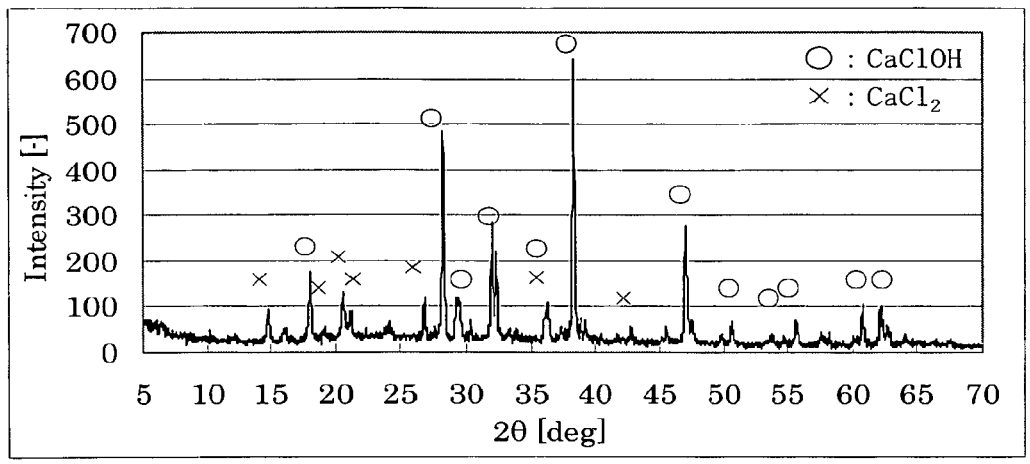
FIG. 23 is a graph illustrating the XRD analysis result of calcium hydroxide in a method for catalytically cracking waste plastics (the raw material is a mixture of PP with PVC and a Ca compound to be added is changed to each of CaO, $CaCO_3$ and $Ca(OH)_2$) according to another example of the present invention.

FIG. 20 shows a relationship between the efflux time and the cumulative run-off quantity (weight %) of decomposition products in cases where a mixture of polypropylene (PP) with polyvinyl chloride (PVC) is decomposed at 420° C. without mixing the FCC waste catalyst but by adding calcium oxide, where a mixture of polypropylene (PP) with polyvinyl chloride (PVC) is decomposed at 420° C. without mixing the FCC waste catalyst but by adding calcium carbonate and where a mixture of polypropylene (PP) with polyvinyl chloride (PVC) is decomposed at 420° C. without mixing the FCC waste catalyst but by adding calcium hydroxide. FIG. 21 shows a carbon number distribution of cracked oil. FIG. 22 shows a change in gas production. FIG. 23 shows the result of XRD analysis of calcium hydroxide after catalytic cracking to petroleum.

As apparent from FIG. 20, where calcium carbonate is used, no influence is found on the yield, depending on a difference in Ca compounds, although the run-off speed is low. Determination of chlorine content in cracked oil by using a simple detector tube method has revealed a difference in a quantity of chlorine due to Ca compounds. Of Ca compounds, calcium hydroxide is found most efficient in effecting the removal. Although calcium hydroxide is the lowest in mol number on mol conversion even at the same quantity of 7.5 g, it is able to remove substantially all hydrogen chloride generated, and the chlorine portion contained in cracked oil is about half when compared with that in the other two compounds. Calcium hydroxide is found to most easily react with hydrogen chloride. As indicated in FIG. 23 on the XRD analysis, calcium hydroxide is given as CaClOH. Other peaks have a crystalline structure of $CaCl_2$, in which it is likely that one hydroxyl group of calcium hydroxide is at first substituted and another hydroxyl group is then substituted and thereafter, still another hydroxyl group is allowed to react, or a two-stage reaction is conducted to remove hydrogen chloride.

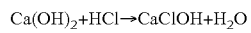

$Ca(OH)_2 + HCl \rightarrow CaClOH + H_2O$

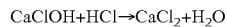

$CaClOH + HCl \rightarrow CaCl_2 + H_2O$     [Chemical formula 2]

As shown in FIG. 21, Ca compounds hardly influence products and calcium hydroxide gives a similar distribution as with the other two compounds. Since there is no change in yield or carbon number distribution of products, calcium hydroxide exhibiting the highest efficiency of removing hydrogen chloride is preferably used in decomposition of plastics including chlorine content.

(Experiment 9)

Evaluation is made for the influence of coexistence of calcium hydroxide used in removing hydrogen chloride with the FCC waste catalyst (FCC (U)). A mixture of 67.5 g of polypropylene (PP) with 7.5 g of polyvinyl chloride (PVC), as a subject to be catalytically cracked to petroleum, is mixed and agitated in the same reaction field as 10 g of the FCC waste catalyst (FCC (U)) and 7.5 g of calcium hydroxide ($Ca(OH)_2$), thereby facilitating the reaction and decomposition to petroleum. Other conditions are the same as those described in Example 1.

Figure 24:
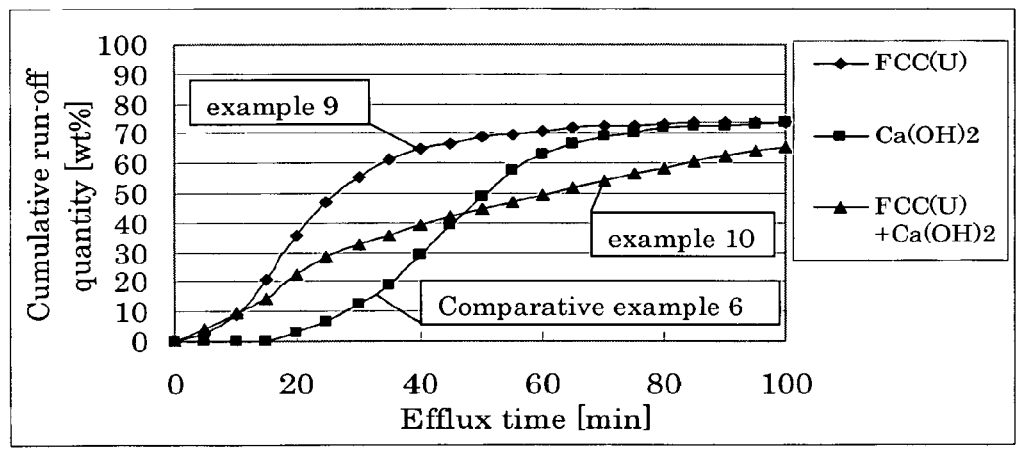
FIG. 24 is a graph illustrating a relationship between the oil fraction efflux time and the cumulative run-off quantity (weight %) in a method for catalytically cracking waste plastics (in the coexistence of the FCC waste catalyst (FCC(U)) with calcium hydroxide) according to another example of the present invention.
Figure 25:
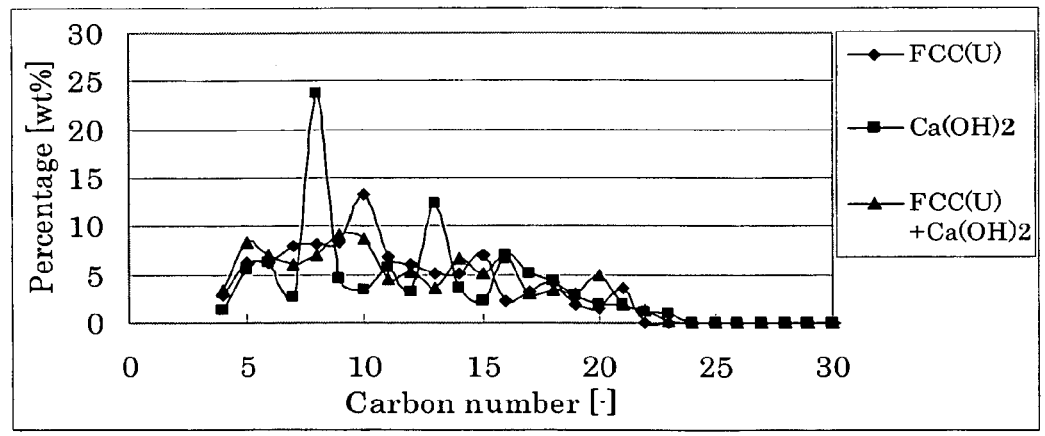
FIG. 25 is a graph illustrating a carbon number distribution of products in a method for catalytically cracking waste plastics (in the coexistence of the FCC waste catalyst (FCC(U)) with calcium hydroxide) according to another example of the present invention.
Figure 26:
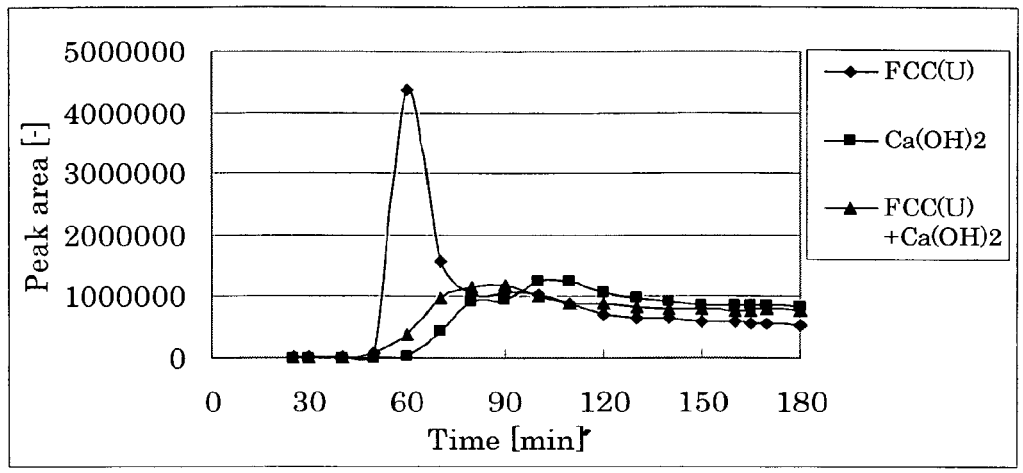
FIG. 26 is a graph illustrating a change in gas production in a method for catalytically cracking waste plastics (in the coexistence of the FCC waste catalyst (FCC(U)) with calcium hydroxide) according to another example of the present invention.
Figure 27:
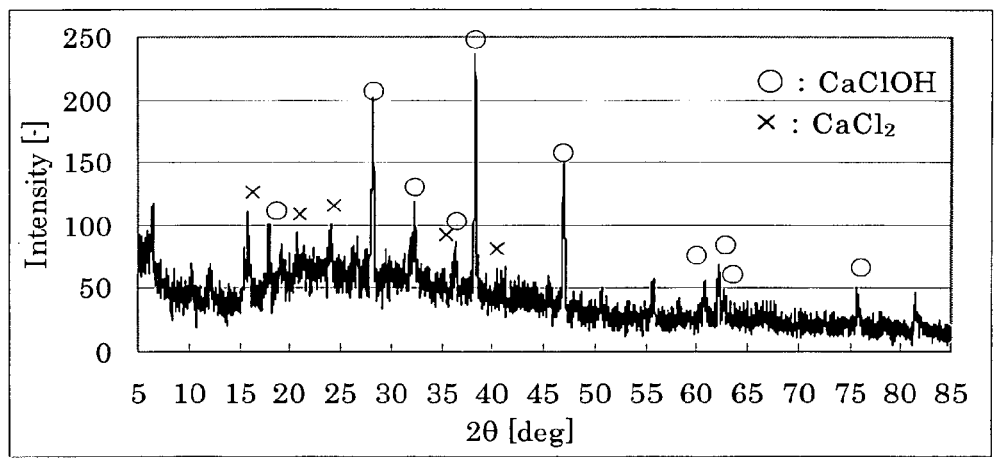
FIG. 27 is a graph illustrating the XRD analysis result of FCC(U)-$Ca(OH)_2$ in a method for catalytically cracking waste plastics (in the coexistence of the FCC waste catalyst (FCC(U)) with calcium hydroxide)according to another example of the present invention.

FIG. 24 shows a relationship between the efflux time and the cumulative run-off quantity (weight %) of decomposition products in cases where a mixture of polypropylene (PP) with polyvinyl chloride (PVC) is decomposed at 420° C. in the presence of the FCC waste catalyst (Example 9), where a mixture of polypropylene (PP) with polyvinyl chloride (PVC) is decomposed at 420° C. without mixing the FCC waste catalyst but in the presence of calcium hydroxide (Comparative Example 6) and where a mixture of polypropylene (PP) with polyvinyl chloride (PVC) is decomposed at 420° C. in the presence of the FCC waste catalyst and calcium hydroxide (Example 10). FIG. 25 shows a carbon number distribution of cracked oil. FIG. 26 shows a change in gas production. FIG. 27 shows the result of XRD analysis of a mixture of the FCC waste catalyst with calcium hydroxide after catalytic cracking to petroleum.

As apparent from FIG. 24, coexistence of the FCC waste catalyst (FCC (U)) with calcium hydroxide results in a slow run-off speed and a low yield, thereby making decomposition of waste plastics difficult. This finding may be due to the fact that calcium hydroxide reacts with hydrogen chloride to produce water but the water acts as a catalyst poison of FCC (U). Despite the above finding, in view of an efficient removal of chlorine, coexistence of the FCC waste catalyst (FCC (U)) with calcium hydroxide is preferable to a single use of calcium hydroxide.

Further, as illustrated in FIG. 27, as with XRD found in a single use of calcium hydroxide, CaClOH has been produced in a mixture of the FCC waste catalyst with calcium hydroxide after catalytic cracking to petroleum, which is suggestive of the occurrence of a similar reaction. Still further, as illustrated in FIG. 25 and FIG. 26, a carbon number distribution of products in the coexistence of the FCC waste catalyst (FCC (U)) with calcium hydroxide is similar to that found in a single use of the FCC waste catalyst (FCC (U)). A gas production quantity in the coexistence of the FCC waste catalyst (FCC (U)) with calcium hydroxide is similar to that found in a single use of calcium hydroxide. On the basis of these findings, such favorable results are obtained that products are available in a wide variety and gas is produced in a smaller quantity. As illustrated in FIG. 24, since a gradient indicating the yield of cracked oil is kept unchanged at a late stage of the reaction time, the yield is considered to become greater as the reaction time is extended. Therefore, a reaction process in the coexistence of the FCC waste catalyst (FCC (U)) with calcium hydroxide is effective and also practical.

(Experiment 10)

Evaluation is made for an optimal quantity of calcium hydroxide when waste plastics in which plastics having a chlorine atom as a composition, such as polyvinyl chloride (PVC), are mixed are subjected to catalytic cracking to petroleum. Waste plastics (a raw material) which is a mixture of 67.5 g of polypropylene (PP) with 7.5 g of polyvinyl chloride (PVC), are prepared by incorporating 10 g of FCC waste catalyst (FCC (U)) and calcium hydroxide (Ca(OH)$_2$) at three different quantities of 2 g, 5 g and 7.5 g. The raw material, FCC waste catalyst (FCC (U)) and calcium hydroxide are then mixed and agitated in the same reaction field, thereby facilitating the reaction and decomposition to petroleum at 420° C. Other conditions are the same as those described in Experiment 1.

Figure 28:
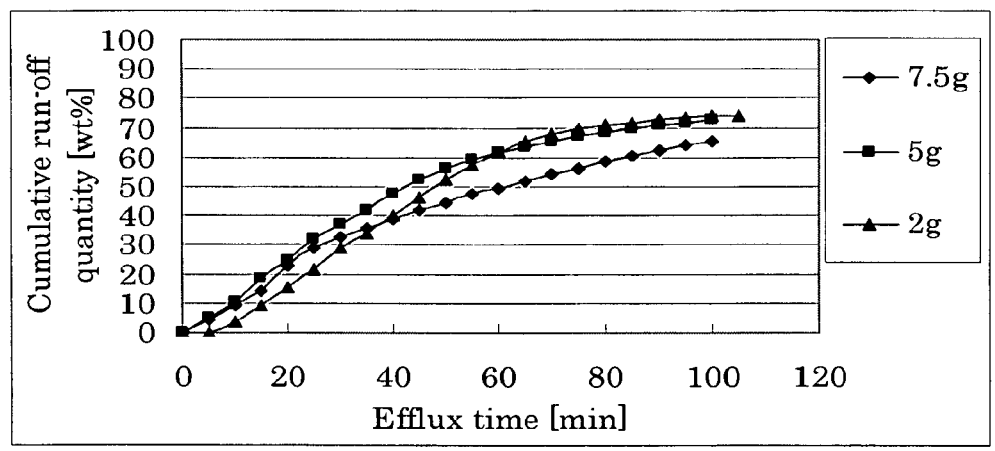
FIG. 28 is a graph illustrating the relationship between the oil fraction efflux time and the cumulative run-off quantity (weight %) in a method for catalytically cracking waste plastics (the material is a mixture of PP with PVC and a quantity of calcium hydroxide to be added is changed at three different levels) according to another example of the present invention.
Figure 29:
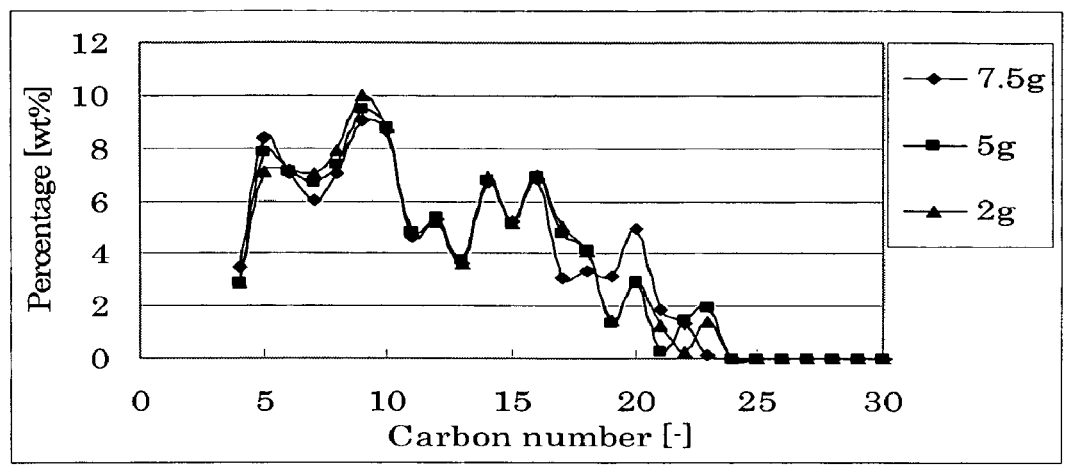
FIG. 29 is a graph illustrating a carbon number distribution of products in a method for catalytically cracking waste plastics (the material is a mixture of PP with PVC and a quantity of calcium hydroxide to be added is changed at three different levels) according to another example of the present invention.
Figure 30:
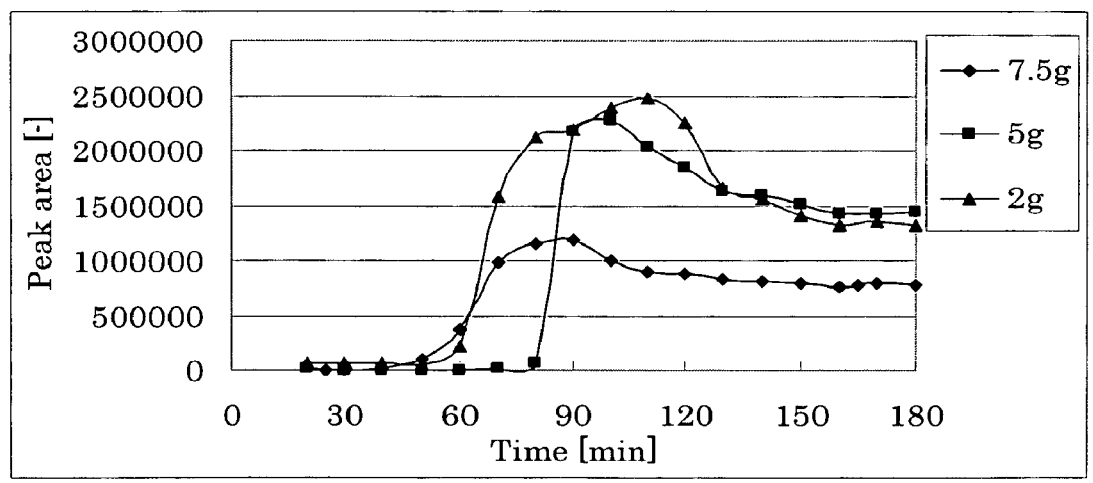
FIG. 30 is a graph illustrating a change in gas production in a method for catalytically cracking waste plastics (the material is a mixture of PP with PVC and a quantity of calcium hydroxide to be added is changed at three different levels) according to another example of the present invention.

FIG. 28 shows a relationship between the efflux time and the cumulative run-off quantity (weight %) of decomposition products. FIG. 29 shows a carbon number distribution of cracked oil. FIG. 30 shows a change in gas production.

As apparent from FIG. 28, reactions will take place more easily as calcium hydroxide (Ca(OH)$_2$) is decreased in quantity. This finding shows that water acts as a catalyst poison to decrease the decomposition efficiency of waste plastics. The result of chlorine analysis of cracked oil has revealed that when calcium hydroxide (Ca(OH)$_2$) is available in a quantity of 5 g corresponding to approximately half of the chlorine content in the raw material, the greatest removal efficiency is obtained and substantially all calcium hydroxide reacts with chlorine. As illustrated in FIG. 29 and FIG. 30, there is substantially no difference in the carbon number distribution of products, and a gas production is increased in the order of easily decomposable substances. Further, a quantity of calcium hydroxide does not influence the carbonization. Therefore, it has been confirmed that chlorine-containing waste plastics are effectively decomposed by using calcium hydroxide (Ca(OH)$_2$) having the mol number which is approximately half the chlorine content contained in a raw material.

The results of Experiment 1 through 10 are summarized in Table 4. In this Table 4, a circle given in the column of FCC waste catalyst indicates a case where the FCC waste catalyst is used and a cross indicates a case that the catalyst is not used. Further, a cross given in the column of Ca compounds indicates a case where no Ca compound is used, and the column where any Ca compound is shown indicates a case where the Ca compound is used.

As apparent from Table 4, when calcium hydroxide (Ca (OH)$_2$) is used as a Ca compound generating hydrogen chloride and chlorine in cracked oil are kept to an extremely low level. Among other things, the best result is obtained in a combined use of the FCC waste catalyst with calcium hydroxide (Ca(OH)$_2$).

TABLE 4

Result of quantitative determination of chlorine content

| FCC waste catalyst | Ca compounds | Generated HCl [mmol] | Chlorine in cracked oil [mmol] | [ppm] |
|---|---|---|---|---|
| X | X | 98.0 | 1.75 | 1150 |
| ○ | X | 74.0 | 1.27 | 830 |
| X | CaCO$_3$ | 76.0 | 0.736 | 480 |
| X | CaO | 17.0 | 0.655 | 433 |
| X | Ca(OH)$_2$ | 0.60 | 0.324 | 210 |
| ○ | Ca(OH)$_2$ | 0.42 | 0.159 | 118 |

Cl: 112 mmol (Experiment 11)

A raw material (RDF composed of PE, PP, PS, chlorine content of 1.4% and ash of 4.4% (solid fuel)) illustrated in Table 5 is processed by a rotary kiln-type (rotary drum-type) reaction vessel rotating at 50 rpm and a carrier gas N$_2$ is blown therein from two sites under a reaction pressure of 1 atm at a quantity of 50 mL/min. Waste plastics are subjected to catalytic cracking to petroleum at reaction temperatures and mixture ratios of raw material with a catalyst given in Table 5 (the upper level).

Table 6 (middle level) shows a material balance of products obtained after the reaction of catalytically cracking waste plastics to petroleum. Further, Table 6 (lower level) shows coke (in catalyst)[wt %], quantity of generated hydrogen chloride [mmol] and chlorine content in cracked oil [ppm].

TABLE 5

| <Cracking conditions> | |
|---|---|
| Raw material | RDF (PE 44%, PP 36%, PS 15%, chlorine content 1.4%, ash 4.4%) |
| Reaction pressure | 1 atm |
| Agitation speed | 50 rpm |
| Flow rate of carrier gas | 100 ml/min (50 ml/min × 2) |

TABLE 6

<Cracking results>

| | Free of catalyst | FCC(U) | Ca(OH)$_2$ | 1) Iron ore | 2) Fe$_2$O$_3$ | 3) FeOOH |
|---|---|---|---|---|---|---|
| Reaction temperature [° C.] | 435 | 420 | 435 | 435 | 435 | 435 |
| Raw material load quantity [g] | 266.6 | 1109.9 | 267.4 | 511.1 | 377.7 | 366.6 |
| FCC(U) [g] | | 1367.37 | 970.16 | 1021.47 | 1009.04 | 976.08 |
| Ca(OH)$_2$ [g] (30% of FCC) | | | 247.93 | 160.64 | 180.7 | 164.3 |
| Fe compound [g] (10% of FCC) | | | | 208.32 | 100.0 | 110.7 |
| Quantity of catalyst [g] | | 1367.4 | 1218.1 | 1390.4 | 1289.7 | 1251.1 |
| Cracked oil [wt %] | 60.6 | 64.9 | 64.5 | 48.2 | 44.7 | 50.8 |
| LPG fraction [wt %] | 3.4 | 13.6 | 12.7 | 11.1 | 15.6 | 14.7 |
| Methane [wt %] | 2.5 | 7.2 | 5.4 | 2.9 | 4.3 | 6.4 |
| Residue [wt %] | 19.8 | 10 | — | 16.7 | 33.3 | 23.1 |
| Material balance [%] | 86.3 | 95.7 | 82.6 | 78.9 | 97.9 | 95.0 |
| Coke (in catalyst) [wt %] | — | — | — | — | — | — |
| Generated hydrogen chloride [mmol] | 51 | 165 | 0 | 0 | 0 | 0 |
| Chlorine content in cracked oil [ppm] | 1258 | 680 | 120 | 85 | 139 | 74 |

As shown in Table 6 (upper level), in this Example, when iron hydroxide (III)-rich iron ore is mixed as an iron compound at 20 mass % with respect to FCC (U), a quantity of generated hydrogen chloride is 0 [mmol] and a quantity of chlorine content in cracked oil is 85 [ppm] which is lower than the TR criteria (Technical Report criteria) of 100 [ppm] as shown in Table 6 (lower level).

Further, where $Fe_2O_3$ is mixed as an iron compound at 10 mass % with respect to FCC(U), as shown in Table 6 (lower level), a quantity of generated hydrogen chloride is 0 [mmol], and chlorine content in cracked oil is 139 [ppm], which exceeds the TR criteria (Technical Report criteria) of 100 [ppm]. However, the level is still low.

Still further, where iron hydroxide (III) (FeO(OH)) is mixed as an iron compound at 11 mass % with respect to FCC(U), as shown in Table 6 (lower level), a quantity of generated hydrogen chloride is 0 [mmol], and chlorine content in cracked oil is 74 [ppm], which is greatly lower than the TR criteria (Technical Report criteria) of 100 [ppm].

The Second Embodiment

Figures 31, 32:
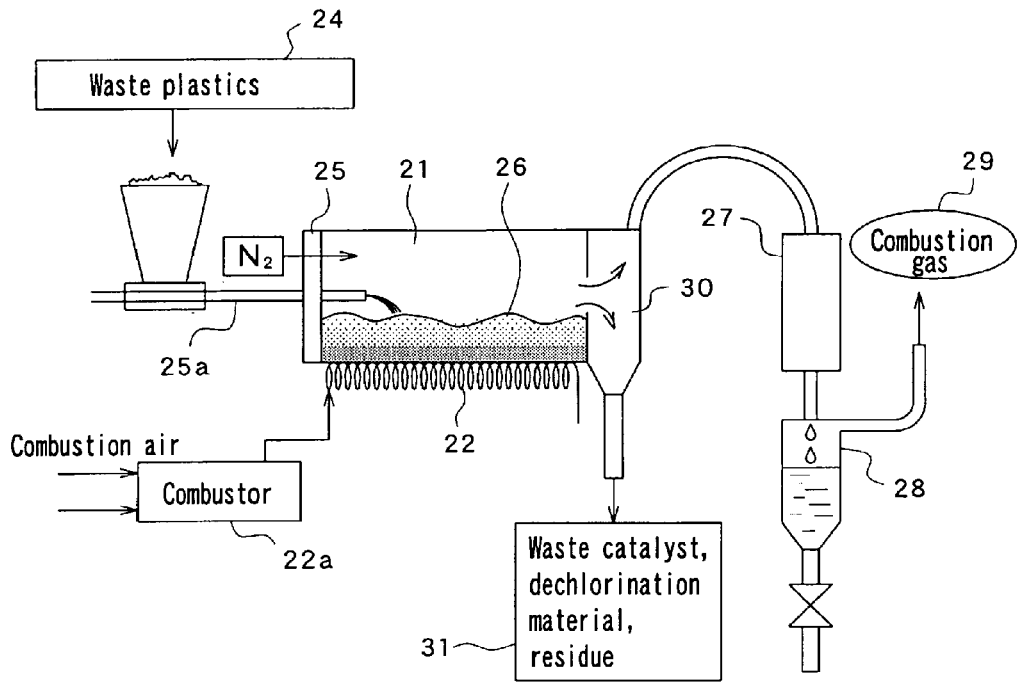
FIG. 31 is a schematic view briefly illustrating the apparatus of reaction processes according to another example of the present invention.
FIG. 32 is a graph illustrating the material balance for the above case.

FIG. 31 is a schematic view of an apparatus for catalytically cracking waste plastics according to the second embodiment of the present invention.

In FIG. 31, the numeral 21 denotes a reaction vessel or a rotary kiln-type (rotary drum-type) of a reaction vessel. The numeral 22 denotes a heater as heating means. As illustrated in FIG. 31, in a combustor 22a of this Embodiment, fuel and air are mixed and burnt to heat a catalyst and others 26 inside the reaction vessel 21 from the bottom of the reaction vessel 21. The numeral 24 denotes a loading port for raw materials, functioning to load waste plastics (a raw material), the FCC waste catalyst (FCC(U)), Ca compounds such as calcium hydroxide and iron oxide into the reaction vessel 21. The numeral 25 denotes an anterior fixing portion to place and fix a raw material feeding mechanism 25a composed of a conveyor for loading raw materials and waste catalysts. The numeral 27 denotes a cooling mechanism which is in association with an inert gas such as nitrogen gas and rare gas, thereby cooling cracked gas from the rotary kiln-type (rotary drum-type) reaction vessel 21 to liquefy and storing the thus liquefied gas at an oil fraction storage tank 28. The numeral 29 denotes a combustible gas which is not liquefied (fusel gas). The numeral 30 denotes a posterior fixing portion, which is in contact with an opening at the back of the rotary kiln-type (rotary drum-type) reaction vessel 21 and by which waste plastics loaded one after another are decomposed and gasified to discharge cracked gas continuously, and the FCC waste catalyst, Ca compounds, decomposed residue and the like are discharged intermittently at a time when a predetermined quantity of waste plastics is completely decomposed and gasified. The numeral 31 denotes a discharged substance storing portion for storing the FCC waste catalyst, Ca compounds and decomposed residue discharged from the reaction vessel 21.

In this Embodiment, the FCC waste catalyst (FCC(U)), calcium hydroxide (Ca compound), iron compounds and waste plastics (raw material) inside the rotary kiln-type (rotary drum-type) reaction vessel 21 are mixed and agitated by rotation of the rotary kiln-type (rotary drum-type) reaction vessel 21, thereby allowing catalytically cracking reaction to proceed. The catalytically cracking of waste plastics to petroleum and the reaction mechanism of trapping hydrogen chloride by Ca compounds are similar to those described in the previous Examples.

The FCC waste catalyst and the like discharged into the discharged substance storing portion 31 are separated from decomposed residue on the basis of a difference in specific gravity or by using a sieve, remaining portions are washed, thereby dissolving water-soluble calcium chloride in water to take out the FCC waste catalyst, Ca compounds and iron compounds prior to reaction. The thus taken out FCC waste catalyst, Ca compounds and iron compounds are regenerated, whenever necessary, after being dried. They can be then reused by addition of Ca compounds. The concentration of calcium chloride in drain water after the FCC waste catalyst is washed is determined to calculate a quantity of Ca compounds used in a dechlorination reaction, and the thus calculated quantity is added accordingly.

FIG. 32 shows a material balance in this Embodiment. It is apparent from this drawing that an oil fraction can be obtained at a high yield of 90%.

The present invention relates to a method for thermally decomposing waste plastics, namely, waste materials of plastics such as polyethylene (PE), polypropylene (PP), polystyrene (PS) or polyethylene terephthalate (PET) and waste plastics having a resin, for example, polyvinyl chloride (PVC), in which chlorine is contained as a composition, and an apparatus therefor, and the present invention can provide a method for catalytically cracking waste plastics which is excellent in decomposition reaction efficiency, capable of decomposing polyethylene composed of linear chain molecules which is difficult in decomposition at a low temperature, with a negligible quantity of decomposed residue, simple in process and able to realize a high energy efficiency of 50% or more in terms of net yield of oil fraction, and a catalytically cracking apparatus.

What is claimed is:

1. A method for catalytically decomposing solid waste plastics comprising:
externally heating a horizontal-type reaction vessel, formed to a cylindrical shape, and containing a mixture of a granular FCC waste catalyst and a granular Ca compound, the mixture thereby being preliminary heated to a temperature range from 350° C. to 435° C., wherein the amount of the FCC waste catalyst is 20 to 60 vol% of the capacity of the reaction vessel, and the Ca compound is present in an amount of 15 to 50 parts by mass with respect to 100 parts by mass of the FCC waste catalyst,
adding and mixing/agitating granular or flake-shaped solid waste plastics by the agitator into the mixture of the heated granular FCC waste catalyst and the Ca compound and allowing the solid waste plastics to be in direct contact with the mixture at a temperature range from 350° C. to 435° C.,
processing the solid waste plastics inside the reaction vessel at a flow rate of 0.2 g to 10 g of the solid waste plastics per gram of the catalyst per hour and heating while coating the heated granular FCC waste catalyst onto the surface of the solid waste plastics to cause decomposition and gasification of the solid waste plastics via an ion reaction, and producing gaseous hydrocarbons, and
removing the gaseous hydrocarbons from the reaction vessel by a carrier gas.

2. A method for catalytically decomposing solid waste plastics according to claim 1
wherein the energy efficiency expressed as net yield of the gaseous hydrocarbons is 50% or more,
wherein the resulting hydrocarbons contain aromatized products, branched hydrocarbon, and linear chain hydrocarbon, wherein the total amount of the aromatized products and the branched hydrocarbon is greater than that of the linear chain hydrocarbon; and wherein the resulting hydrocarbons contain chlorine in an amount of 139 ppm or less.

3. A method for catalytically decomposing solid waste plastics according to claim 2, wherein the Ca compound is Ca(OH)$_2$, CaCO$_3$, or CaO.

4. A method for catalytically decomposing solid waste plastics according to claim 3 further comprising:
mixing granular iron compounds with the FCC waste catalyst.

5. A method for catalytically decomposing solid waste plastics according to claim 4 wherein the granular iron compounds are iron hydroxide (III) (FeO(OH)).

6. A method for catalytically decomposing solid waste plastics according to claim 5, wherein the reaction vessel is a rotary kiln-type reaction vessel and further comprising:
loading the waste plastics continuously to effect decomposition and gasification.

7. A method for catalytically decomposing solid waste plastics according to claim 2, wherein the reaction vessel is a rotary kiln-type reaction vessel and further comprising:
loading the waste plastics continuously to effect decomposition and gasification.

8. A method for catalytically decomposing solid waste plastics according to claim 3, wherein the reaction vessel is a rotary kiln-type reaction vessel and further comprising:
loading the waste plastics continuously to effect decomposition and gasification.

9. A method for catalytically decomposing solid waste plastics according to claim 4, wherein the reaction vessel is a rotary kiln-type reaction vessel and further comprising:
loading the waste plastics continuously to effect decomposition and gasification.

10. A method for catalytically decomposing solid waste plastics according to claim 1 further comprising:
mixing granular iron compounds with the FCC waste catalyst.

11. A method for catalytically decomposing solid waste plastics according to claim 10 wherein the granular iron compounds are iron hydroxide (III) (FeO(OH)).

12. A method for catalytically decomposing solid waste plastics according to claim 11, wherein the reaction vessel is a rotary kiln-type reaction vessel and further comprising:
loading the waste plastics continuously to effect decomposition and gasification.

13. A method for catalytically decomposing solid waste plastics according to claim 10, wherein the reaction vessel is a rotary kiln-type reaction vessel and further comprising:
loading the waste plastics continuously to effect decomposition and gasification.

14. A method for catalytically decomposing solid waste plastics according to claim 1, wherein the reaction vessel is a rotary kiln-type reaction vessel and further comprising:
loading the waste plastics continuously to effect decomposition and gasification.

* * * * *